(12) United States Patent
Pappas et al.

(10) Patent No.: US 9,703,476 B1
(45) Date of Patent: Jul. 11, 2017

(54) MULTI-TOUCH COCKPIT INTERFACE FOR CONTROLLING AIRCRAFT SYSTEMS

(75) Inventors: Nicholas William Pappas, Seattle, WA (US); Mark Ivan Nikolic, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 778 days.

(21) Appl. No.: 13/484,029

(22) Filed: May 30, 2012

Related U.S. Application Data

(63) Continuation-in-part of application No. 13/332,446, filed on Dec. 21, 2011.

(60) Provisional application No. 61/427,015, filed on Dec. 23, 2010.

(51) Int. Cl.
| | | |
|---|---|---|
| G06F 3/0488 | (2013.01) | |
| G06F 3/0484 | (2013.01) | |
| G06F 3/041 | (2006.01) | |

(52) U.S. Cl.
CPC ........ *G06F 3/04886* (2013.01); *G06F 3/0416* (2013.01); *G06F 3/0488* (2013.01); *G06F 3/04842* (2013.01); *G06F 3/04847* (2013.01); *G06F 2203/04803* (2013.01)

(58) Field of Classification Search
CPC ......... G06F 2203/04808; G06F 3/0488; G06F 3/0416; G06F 3/04886; G06F 2203/048; G06F 3/0482; G06F 3/017; G06F 3/0412; G06F 2203/04104; G06F 2203/04803; G05D 1/0016; G06T 2200/24
USPC ........................................................ 345/661
See application file for complete search history.

(56) References Cited

U.S. PATENT DOCUMENTS

| | | | |
|---|---|---|---|
| 6,995,536 B2 | 2/2006 | Challoner | |
| 7,321,318 B2 | 1/2008 | Crane et al. | |
| 7,418,319 B2 * | 8/2008 | Chen et al. | 701/14 |
| 7,460,029 B2 | 12/2008 | Boorman et al. | |
| 7,885,732 B2 | 2/2011 | Troy et al. | |
| 7,967,549 B2 | 6/2011 | Geist et al. | |
| 7,983,450 B2 | 7/2011 | Higgins | |
| 2006/0026535 A1 * | 2/2006 | Hotelling et al. | 715/863 |
| 2007/0150842 A1 * | 6/2007 | Chaudhri et al. | 715/863 |
| 2009/0201246 A1 * | 8/2009 | Lee | G06F 1/1626 345/156 |
| 2011/0187651 A1 * | 8/2011 | Whitlow | G06F 3/041 345/173 |
| 2012/0159337 A1 * | 6/2012 | Travilla | G06Q 30/0631 715/738 |

OTHER PUBLICATIONS

Nikolet et al., "Methods, Systems, and Apparatus for Advanced Cockpit Workspace and Crew Interfaces," U.S. Appl. No. 13/332,446, filed Dec. 21, 2011, 42 Pages.

* cited by examiner

*Primary Examiner* — Gregory J Tryder
*Assistant Examiner* — Scott E Sonners
(74) *Attorney, Agent, or Firm* — Yee & Associates, P.C.

(57) ABSTRACT

A system and method for controlling an aircraft system. An operator interaction with a control is received. The control comprises an image representing a hardware control for controlling the aircraft system. The image representing the hardware control is changed to represent a change in a state of the control in response to receiving the operator interaction. The aircraft system is operated in the manner indicated by the state of the control as represented in the image.

26 Claims, 26 Drawing Sheets

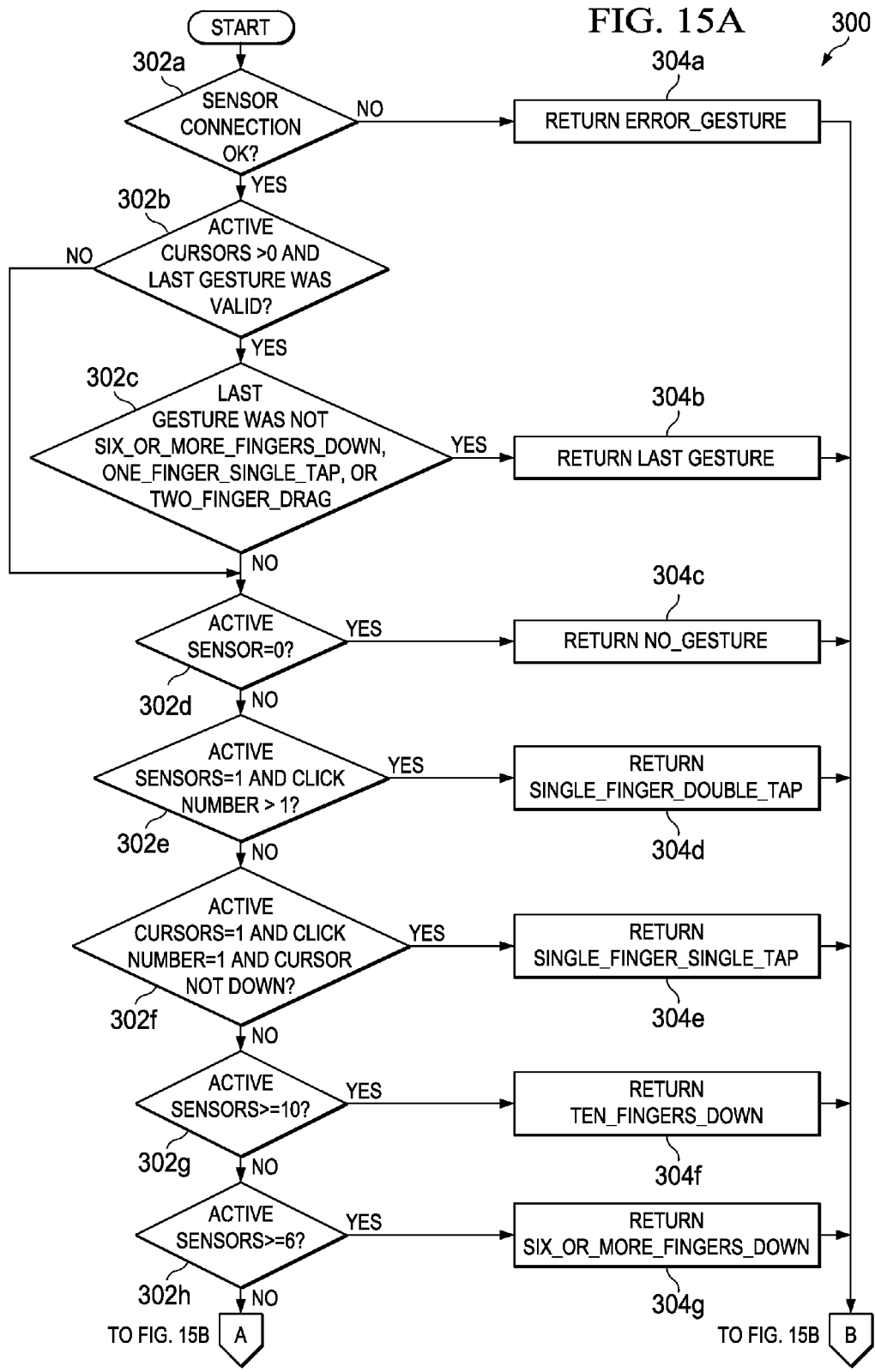

MULTI-TOUCH COCKPIT INTERFACE FOR CONTROLLING AIRCRAFT SYSTEMS

CROSS-REFERENCE TO RELATED APPLICATION

This application is a continuation-in-part of U.S. patent application Ser. No. 13/332,446, filed on Dec. 21, 2011, which claims the benefit of U.S. Provisional Patent Application No. 61/427,015, filed on Dec. 23, 2010, which are incorporated herein by reference in their entirety.

BACKGROUND INFORMATION

1. Field

The present disclosure relates generally to apparatus, systems, and methods for advanced cockpit workspace and associated flight crew interfaces. More particularly, the present disclosure relates to interfaces for controlling aircraft systems that include a number of controls implemented on a touch screen display in the cockpit of an aircraft.

2. Background

Pilots (flight crew) of modern commercial aircraft utilize a number of means to monitor, manage, and control various aspects of their flight and the systems on their aircraft. In the large, these means are centralized around three foundational functions of aviating, navigating, and communicating, to achieve the pilots' objectives with respect to their assigned cockpit duties.

Thus, in executing their cockpit duties, pilots utilize not only their flying skills, but must also manage myriad information related to their flight and their aircraft as efficiently as possible. Generally, such management of information related to the flight entails utilizing a number of means for acquiring, utilizing, and redirecting graphical, aural, and textual information to and from the aircraft systems. For example, such means may be implemented via a number of cockpit (flight deck) interfaces such as displays, control panels, wheels, levers, switches, buttons, keyboard devices, cursor control devices, and voice/audio systems.

Historically, the aforementioned means and the functions assigned to them have been implemented via hardware and/or software to perform a specific set of functions at specified locations in the cockpit. For example, voice/audio systems and navigation control panels are typically located on the control pedestal (aislestand). Control functions for the autopilot may be located on the glare shield. Visual feedback from a number of aircraft systems may be displayed on displays located on the forward panel.

Such a physical distribution of control of and feedback from aircraft systems, as well as the bifurcation of control functions and feedback functions, pose a number of challenges for aircraft designers and pilots. Configuration changes to the functions themselves or their location in the cockpit often entails a complex engineering effort at the aircraft manufacturer and/or at an airline maintenance organization.

Therefore, it would be desirable to have a method and apparatus that takes into account at least some of the issues discussed above, as well as other possible issues.

SUMMARY

It should be appreciated that this Summary is provided to introduce selected aspects of the disclosure in a simplified form that are further described below in the Detailed Description. This Summary is not intended to be used to limit the scope of the claimed subject matter. Other aspects and features of the present disclosure, as defined solely by the claims, will become apparent to those ordinarily skilled in the art upon review of the following non-limited detailed description of the disclosure in conjunction with the accompanying figures.

An embodiment of the present disclosure provides a method for controlling an aircraft system. An operator interaction with a control is received. The control comprises an image representing a hardware control for controlling the aircraft system. The image representing the hardware control is changed to represent a change in a state of the control in response to receiving the operator interaction. The aircraft system is operated in the manner indicated by the state of the control as represented in the image.

Another embodiment of the present disclosure provides an apparatus comprising a touch screen display and a controller. The touch screen display is located in a cockpit of an aircraft. The controller is configured to display on the touch screen display a control for controlling an aircraft system, wherein the control comprises an image representing a hardware control for controlling the aircraft system, to receive from the touch screen display an indications of an operator interaction with the control, to change the image representing the hardware control to represent a change in a state of the control in response to receiving the indication of the operator interaction, and to operate the aircraft system in a manner indicated by the state of the control as represented in the image.

Another embodiment of the present disclosure provides another apparatus comprising a touch screen display and a controller. The controller is configured to display on the touch screen display a number of controls for controlling a radio, wherein the number of controls comprises images selected from images of dials, images of switches, images of buttons, and images of sliders, to receive from the touch screen display indications of operator interactions with the number of controls, to change the images to represent changes in a state of the number of controls in response to receiving the indications of the operator interactions, and to operate the radio in a manner indicated by the state of the number of controls as represented in the images.

Another embodiment of the present disclosure provides another method for controlling an aircraft system. An operator interaction with an image representing a dial is received. The dial is configured to be moved between a discrete number of rotational positions. The image representing the dial is changed to indicate a change in a rotational position of the dial in response to receiving the operator interaction. The aircraft system is operated in a manner indicated by the rotational position of the dial as represented in the image.

Another embodiment of the present disclosure provides another apparatus comprising a touch screen display located in a cockpit of an aircraft and a controller. The controller is configured to display on the touch screen display an image representing a dial, wherein the dial is configured to be moved between a discrete number of rotational positions, to receive from the touch screen display an indication of an operator interaction with the image representing the dial, to change the image representing the dial to indicate a change in a rotational position of the dial in response to receiving the indication of the operator interaction, and to operate the aircraft system in a manner indicated by the rotational position of the dial as represented in the image.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 15A-15D are diagrams illustrative of how gestures are processed in an FDCI-based cockpit;

DETAILED DESCRIPTION

Figure 1:
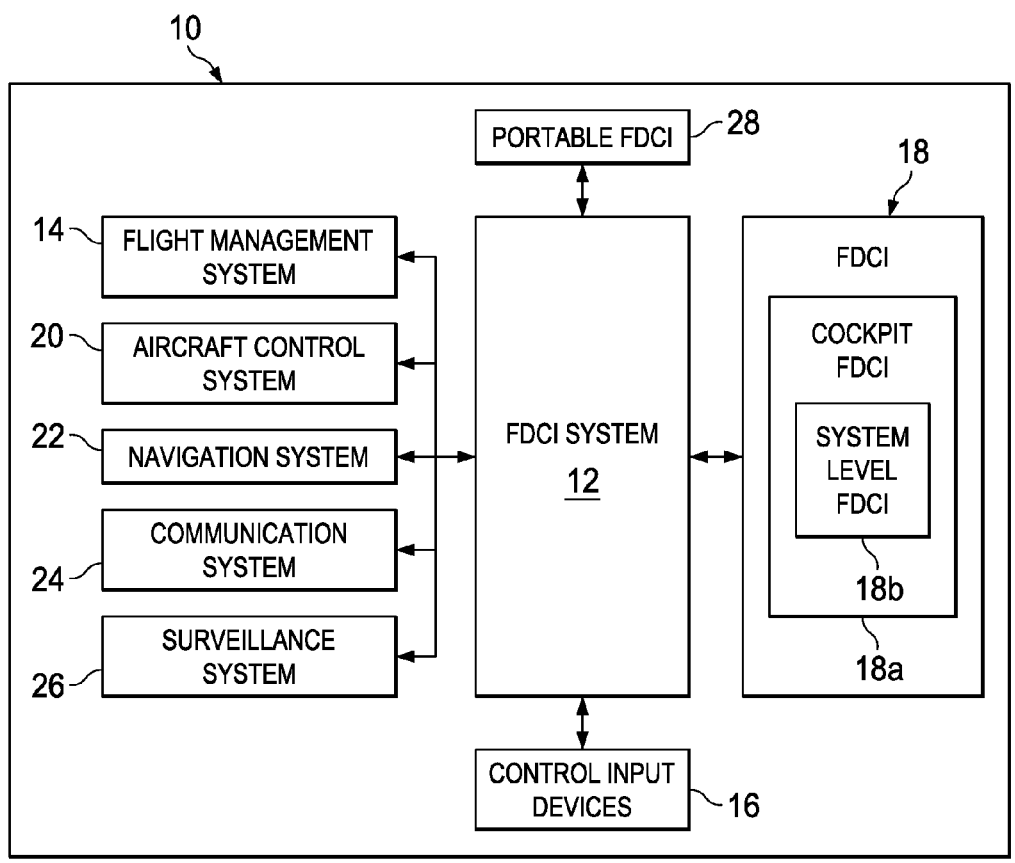
FIG. 1 is a schematic diagram of a generalized aircraft systems architecture centered on an FDCI system.

The following disclosure describes methods, systems, and apparatus for Haptically-enabled, Moveable, and Networked (HMN) Flexible Display/Control Interface (FDCI) devices connected to a configurable multifunction cockpit platform. Certain specific details are set forth in the following description and the figures to provide a thorough understanding of the various embodiments of the disclosure. Well-known structures, systems, and methods often associated with aircraft control, display, and flight management systems have not been shown or described to avoid unnecessarily obscuring the description of the various embodiments of the disclosure. In addition, those of ordinary skill in the relevant art will understand that the additional embodiments of the present disclosure may be practiced without several of the details described below.

Many embodiments of the disclosure described below may take the form of computer-executable instructions, such as routines executed by a programmable computer. Those skilled in the relevant art will appreciate that the invention can be practiced on other computer system configurations as well. The disclosure can be embodied in a special-purpose computer or data processor that is specifically programmed, configured, or constructed to perform one or more of the computer-executable instructions described below. Accordingly, the term "computer", as generally used herein, refers to any data processor that can be engaged in a cockpit, including computers for cockpit display systems, Flight Management Computers (FMC), Flight Control Computers (FCC), Electronic Flight Bags (EFB), laptops, tablet computers, or other hand-held devices.

The disclosure can also be practiced in distributed computing environments, in which tasks or modules are performed via remote processing devices that are linked through a communication network such as those enabled via datalink by the aircraft communication systems. In a distributed computing environment, program modules or subroutines may be located in both local and remote memory storage devices. Aspects of the disclosure described below may be stored or distributed on computer-readable media, including magnetic or optically readable computer disks (e.g., removable disks), as well as distributed electronically over networks. Data structures and transmission of data particular to aspects of the disclosure are also encompassed within the scope of the disclosure. Information handled in accordance with aspects of the disclosure can be presented on displays or display media, such as, for example, CRT screens, LCD screens, head-up displays, touch screens, or other suitable display devices.

The different illustrative embodiments recognize and take into account a number of different considerations. "A number", as used herein with reference to items, means one or more items. For example, "a number of different considerations" means one or more different considerations.

Pilots (flight crew) of modern commercial aircraft utilize a number of means to monitor, manage, and control various aspects of their flight and the systems on their aircraft. In the large, these means are centralized around three foundational functions of aviating, navigating, and communicating to achieve the pilots' objectives with respect to their assigned cockpit duties.

Thus, in executing their cockpit duties, pilots utilize not only their flying skills but must also manage myriad information related to their flight and their aircraft as efficiently as possible. Generally, such management of information related to the flight entails utilizing a number of means for acquiring, utilizing, and redirecting graphical, aural, and textual information to and from the aircraft systems. For example, such means may be implemented via a number of cockpit (flight deck) interfaces such as displays, control panels, wheels, levers, switches, buttons, keyboard devices, cursor control devices, and voice/audio systems.

Historically, the aforementioned means and the functions assigned to them have been implemented via hardware and/or software to perform a specific set of functions at specified locations in the cockpit. For example, voice/audio system and navigation control panels are typically located on the control pedestal (sometimes referred to as aislestand). Control functions for the autopilot may be located on the glare shield. Visual feedback from a number of aircraft systems may be displayed on displays located on the forward instrument panel.

Such a physical distribution of control functions and feedback functions from aircraft systems, as well as the bifurcation of control functions from feedback functions pose a number of challenges for aircraft designers and pilots. Configuration changes to the functions themselves or their location in the cockpit often entails a complex engineering effort at the aircraft manufacturer and/or at an airline maintenance organization. Thus, once a particular cockpit configuration, including the arrangement of displays and control panels, has been implemented, it would take considerable maintenance and engineering effort to reconfigure the cockpit to move, change, or replace displays and control panels.

In addition, once a certain cockpit configuration has been implemented, the options provided to the flying crew to modify the configuration to their specific needs are often limited. For example, in certain embodiments, flight crew can make changes to multifunction displays, including moving displayed information from one multifunction display to another multifunction display using multifunction display selectors as described in U.S. Pat. No. 7,321,318, entitled "Methods and Systems for Controlling the Display of Information at an Aircraft Flight Deck" and incorporated herein in its entirety by reference. However, the flight crew cannot make changes to, for example, the position and orientation of the displays or control functions or reconfigure the cockpit to better suit their immediate task at hand.

The different illustrative embodiments also recognize and take into account that it may be desirable to provide for the control of additional and more advanced aircraft systems from the cockpit of an aircraft. For example, without limitation, it may be desirable to provide multiple radios and new radio technology for aircraft communication. Multiple radios using various different radio technologies may require the use of multiple dissimilar interfaces in the cockpit. Currently, such multiple interfaces may be implemented in the cockpit by the addition of new hardware or shoe-horning new functions into existing cockpit systems.

Current systems and methods for adding new interfaces for aircraft systems into an aircraft cockpit may result in additional clutter, weight and complexity. As a result, current systems and methods for implementing interfaces for aircraft systems may reduce the effectiveness of information presentation to the flight crew, increase execution time, and affect aircraft operating efficiency in undesired ways.

Thus, there is a need for methods, systems, and apparatus that allow optimal configuration of both the physical and functional aspects of cockpit interfaces.

One way of meeting this need is by a reconfigurable smart crew interface apparatus and associated methods and systems that admit a flexibly optimal allocation of cockpit control and feedback functions. The present disclosure addresses this need via Haptically-enabled, Moveable, and Networked (HMN) Flexible Display/Control Interface (FDCI) devices connected to a configurable multifunction cockpit platform.

Before embarking on a more detailed discussion of the disclosure, it may be helpful to briefly explain an organizing principle of the disclosure that enables the new capabilities of the flight crew. Previous cockpit hardware and cockpit layouts impart certain rigidity. For example, whereas a pilot may be interested in changing an aspect of a system such as a navigation system, flight management system, or a display system, the pilot may need to manipulate a particular control panel on the forward or lower pedestal and get feedback as to the response of the system on one of the forward displays. In this case, the physical allocation of the interaction is bifurcated into two different physical cockpit locations. In addition, functional aspects related to the control input and the visual feedback are also bifurcated into at least two functional domains. These two functional domains are the control domain and the display domain.

For aircraft designers as well as pilots, these types of bifurcations pose engineering and operational challenges that persist throughout the service life of the aircraft. In addition to difficulties in making configuration changes as described above, these bifurcations may also increase training time, increase pilot workload, as well as increase the chance for error.

One way of addressing these design bifurcations and their drawbacks is to implement solutions that combine both the control and feedback aspects of a system in one cockpit location such that the physical and functional aspects of the crew interface tasks are as collocated as possible. An integral benefit of such solutions is that they admit more flexibility in terms of freeing up physical space that would otherwise have been reserved for the disjointed allocation of the control and feedback functions of such a system.

A second facet of the aforementioned integral benefit is that such solutions also allow designers and pilots to easily move around the combined feedback and control functions from one cockpit location to another cockpit location, or even to multiple cockpit locations. Yet a third facet of the capability is that it allows all cockpit crew including the flying pilot, non-flying pilot, relief pilots, or other crew members to gain better access to the control and feedback functions such that they can easily view the feedback, review flight progress, and assist each other.

Thus, by the way of an example and not limitation, if a flight management (FM) interface device had a standalone display and a standalone control input such as a control display unit (CDU) or keypad, one would have to reserve two cockpit locations for the control (keypad) functions and display (display screen) functions. Even if one could move the display functions from one display to a second display, the control functions will have to remain at the same physical location, or alternatively have to be physically duplicated near the second display location.

But if one could design a control display unit (CDU) as is done today, which combines certain display functions with the control functions, then one would need to reserve one cockpit location for both control and display functions. Extending the example, if one could design an interface such as a touch-enabled control display unit (CDU) or forward display, one would be able to combine some display and control functions directly onto a single cockpit location. However, there still remain challenges such as being able to move the combined functions to various locations in the cockpit and making the display and control functions available in a context-sensitive and optimal manner.

Further extending the example, if one could design the aforementioned touch screen crew interface such that it can reconfigure its function as a function of location in the cockpit—for example, it serves as a normal display in a vertical orientation and an interactive keypad/keyboard in a horizontal orientation, or even as a desk/work tray in the "horizontal and off" configuration, it affords the flight crew even more flexibility in performing their cockpit tasks.

More generally, crew interfaces that can be reconfigurable in real-time as a function of flight crew input, system input, or both help address the engineering and operational challenges described above. In the last example above, where the touch screen crew interface is movable and its function is reconfigurable as a function of, for example, its location defined by parameters such as its position and orientation in the cockpit, at least three aspects of changes imparted to the cockpit systems must be addressed.

The first aspect, discussed in the FDCI SYSTEM section below, addresses the problem of to how to manage and control the different states of the cockpit configuration. The second aspect, further discussed in the COCKPIT RECONFIGURATION section below, focuses on how to impart physical reconfigurations of the cockpit. Lastly, the third aspect is focused on how to make cockpit functions available to the flight crew during and after the cockpit configuration, and is discussed in the FLIGHT CREW INTERACTIONS section below.

FDCI System

Turning now to a more detailed discussion of the disclosure and the figures, FIG. 1 depicts an embodiment of a generalized aircraft systems architecture 10 centered on an FDCI system 12. Cockpit interfaces may be implemented as Haptically-enabled, Moveable, and Networked (HMN) Flexible Display/Control Interface (FDCI) touch-screen devices (HMN-FDCI; hereafter simply called FDCI 18 for readability purposes) suitably mounted on multiple platforms and locations throughout the cockpit.

Throughout this disclosure, the term FDCI 18 is used to refer to FDCIs when particularity as to the FDCIs location or specific function is not required. The term cockpit FDCI 18a is used to refer to FDCI that physically take a portion of the cockpit space such as a forward instrument panel 54 (see FIG. 3) FDCI that can host primary flight display and navigation display functions, or a control pedestal FDCI 58 that takes, for example, half or the entire top surface of the control pedestal and is able to host one or more system-level FDCI 18b. The term system-level FDCI 18b is used to refer to FDCIs that are used for display and control functions for particular systems or subsystems of, for example and without limitation, the Flight Management System 14, the Aircraft Control System 20, and the Surveillance System 26.

Figure 6A:
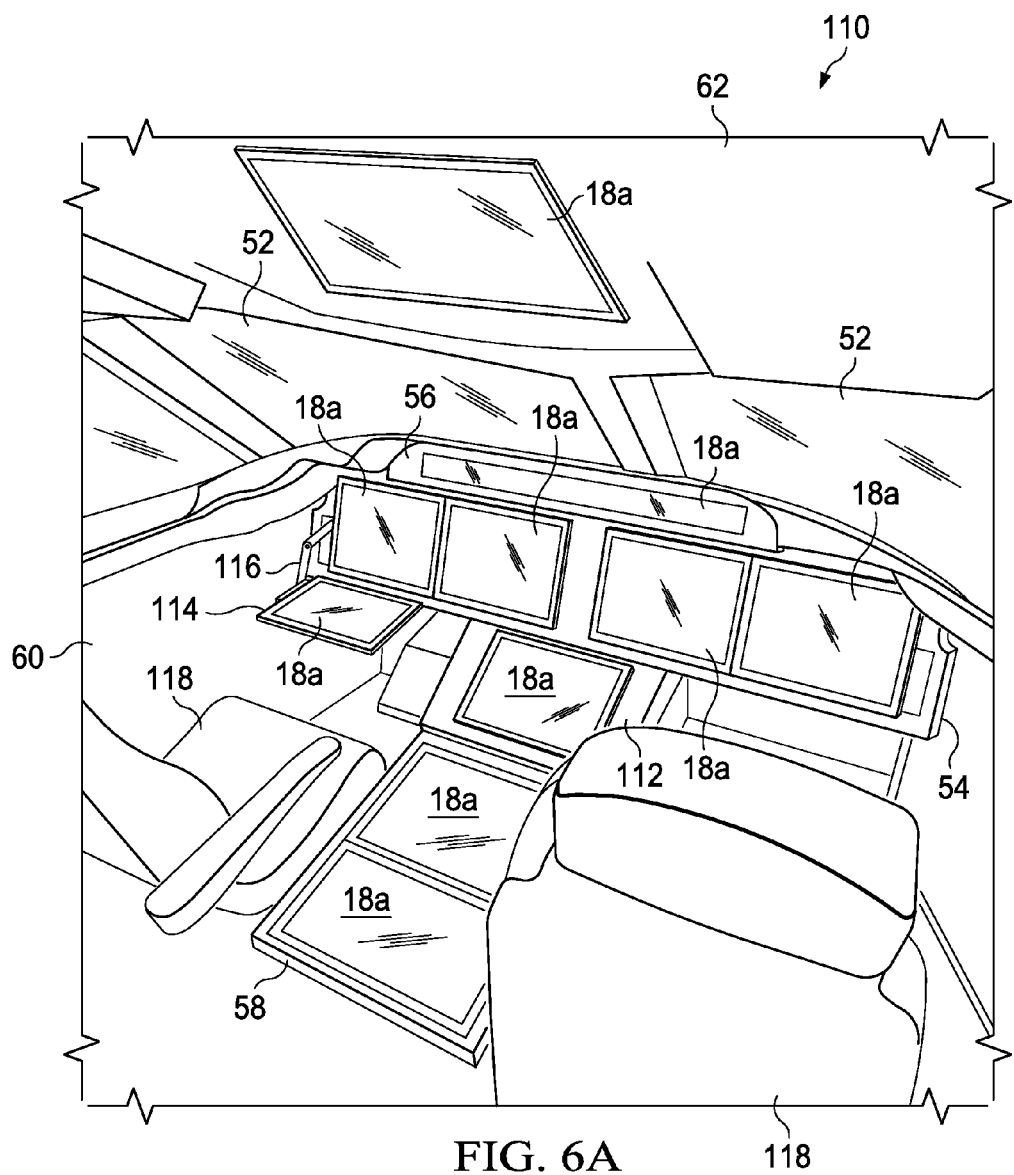
FIG. 6A illustrates a generalized FDCI-based cockpit.
Figure 7:
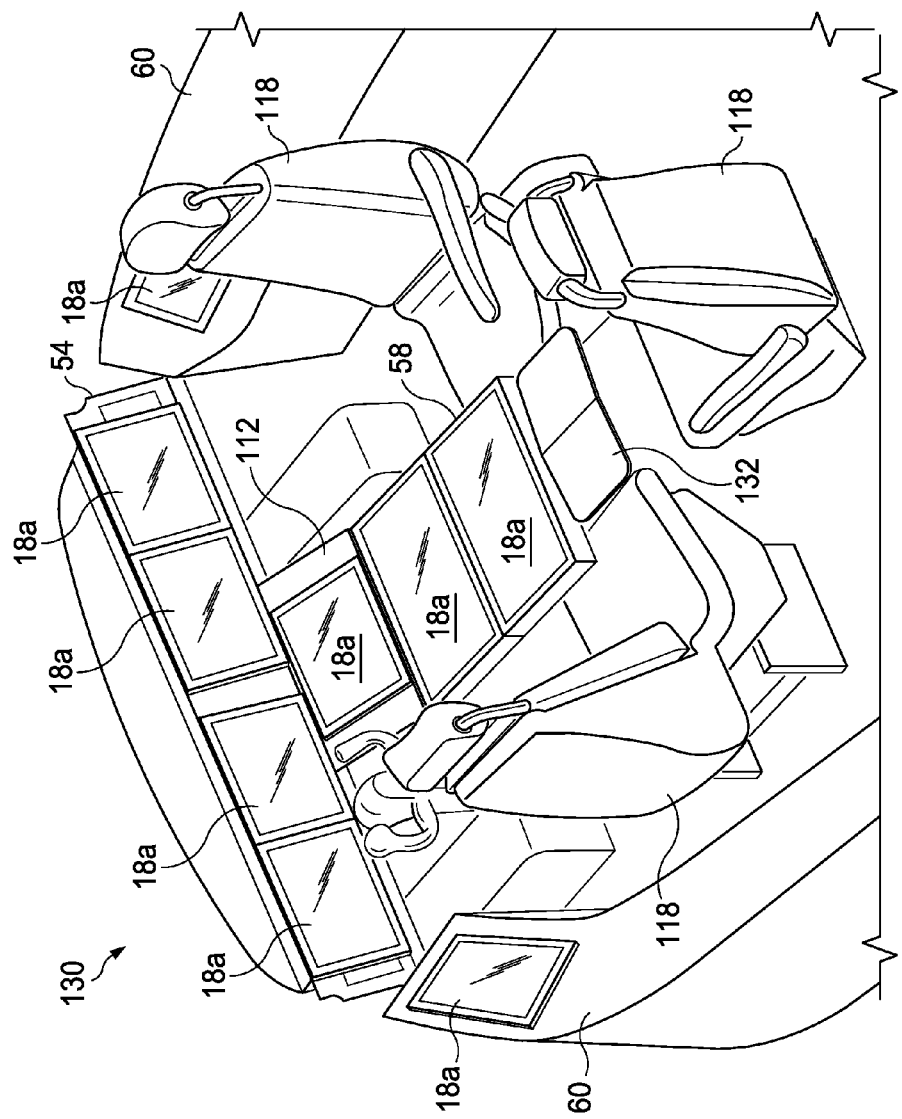
FIG. 7 is a diagram illustrating a reconfigured control pedestal and its FDCIs that create a more collaborative cockpit workspace.

The FDCIs 18 that are enabled with multi-touch may come with large interfaces (e.g., 9×16 inches) that can be virtually partitioned so as to allow multiple system-level FDCIs 18b on a single cockpit FDCI 18a. Thus, for example, there may be two cockpit FDCIs 18a on the control pedestal 58 as shown on FIG. 6A (i.e., control pedestal FDCIs) hosting a number of control functions presented as system-level FDCIs 18b such as an aircraft control system FDCI, communications system FDCI, and surveillance FDCI. There may also be one or more cockpit FDCIs 18a on the forward instrument panel 54 (i.e. forward instrument panel FDCIs) hosting a number of control and display functions such as primary flight display functions and navigation display functions similar to that shown in FIG. 4. In addition, cockpit FDCIs 18a may also be mounted approximate to a sidewall as shown in FIG. 7 or the overhead panel as shown in FIG. 6A hosting additional cockpit systems such as control functions for aircraft systems including electrical power, hydraulic system, environmental control system, and the like.

The flexibility in the allocation of functions among the interfacing systems such as the Aircraft Control system 20, the Flight Management System 14, and the FDCI system 12 as well as between the FDCI system 12, the cockpit FDCIs 18a, and the system-level FDCIs 18b, that are hosted on the cockpit FDCIs 18a to manage certain design criteria such as redundancies and failure modes is up to the designer and is within the scope of this disclosure. Those skilled in the art will appreciate that FIG. 1 is one configuration of many that can be implemented for an embodiment of an FDCI system 12 and an FDCI-enabled aircraft.

For example, and without limitation, the FDCI system 12 can be hosted on a number of on-board computers or devices suitable for the aircraft configuration at hand such as a dedicated FDCI computer (not shown) or a Flight Management System (FMS) 14. Components of the FDCI system 12 or associated interface modules such as system-level FDCIs 18b may be hosted on shared or dedicated cockpit FDCIs 18a. System-level FDCIs 18b may also be wholly or partially implemented on control input devices 16, or other aircraft systems or their components such as the Flight Management System 14, the Aircraft Control System 20, and the Communication system 24.

For example, in an embodiment on certain older generation aircraft and flight simulators, one may choose to partially implement FDCI-based functionality for functions such as an Electronic Flight Bag (EFB) 92 (see FIG. 4) which may be implemented on a Portable FDCI 28. In another distinct embodiment for other older generation aircraft, one may choose to also partially implement FDCI-based functionality for certain select functions such as an FMS 14. In yet another distinct embodiment for new aircraft, one may choose to configure the cockpit with as many cockpit functions as practicable implemented via FDCIs 18.

Referring to FIG. 1, an FDCI system 12 is provided to manage substantially all of the flight crew interaction with the aircraft. The FDCI system 12 may be coupled or connected to the interfacing systems of FIG. 1. In some embodiments, the term "coupled" may be used to indicate that two or more components are in either direct or indirect (i.e., with an intervening component between them) physical, electrical, or communicative (e.g., wireless connection) contact with each other or that two or more elements co-operate or interact with each other. Similarly, the term "connected" may be used to indicate that two or more components are in direct physical, electrical, or communicative contact with each other.

In a preferred embodiment, the FDCI system 12 receives information provided by the interfacing systems described in FIG. 1 that affect aspects of the flight of the aircraft and its systems and makes it available to the flight crew on the FDCIs 18. The FDCI system 12 also transmits information that has been modified, changed or updated by the flight crew using interactive capability of the FDCI systems 12 and FDCIs 18 interactive capability, and potentially other Control Input Devices 16 back to the systems shown in FIG. 1 to affect flight operating parameters of the aircraft such as speed, thrust, altitude, performance or other aspects related to flying, navigation, or communication functions. Accordingly, the FDCI system 12 is used to manage the aircraft-to-pilot and pilot-to-aircraft interaction in a centralized manner suitable for enabling real-time cockpit reconfiguration as described later in this disclosure.

Examples of how the FDCI system 12 interacts with interfacing systems can be demonstrated using the systems shown in FIG. 1. In this regard, the Aircraft Control System 20 (components of the aircraft flight control system not shown) provides real-time flight operating parameter-related information from flight control computers, autopilot and autothrust systems, and selected flight control inputs such as from a Mode Control Panel (MCP) 94 (shown in FIG. 4) which may be hosted on a cockpit FDCI 18a. It also receives flight operating parameter commands or settings from the Flight Management System 14 or other systems and directs them to its component systems, such as for example, the autothrottle and engines, to affect the flight of the aircraft in real-time or at a later point in the flight.

Figure 2:
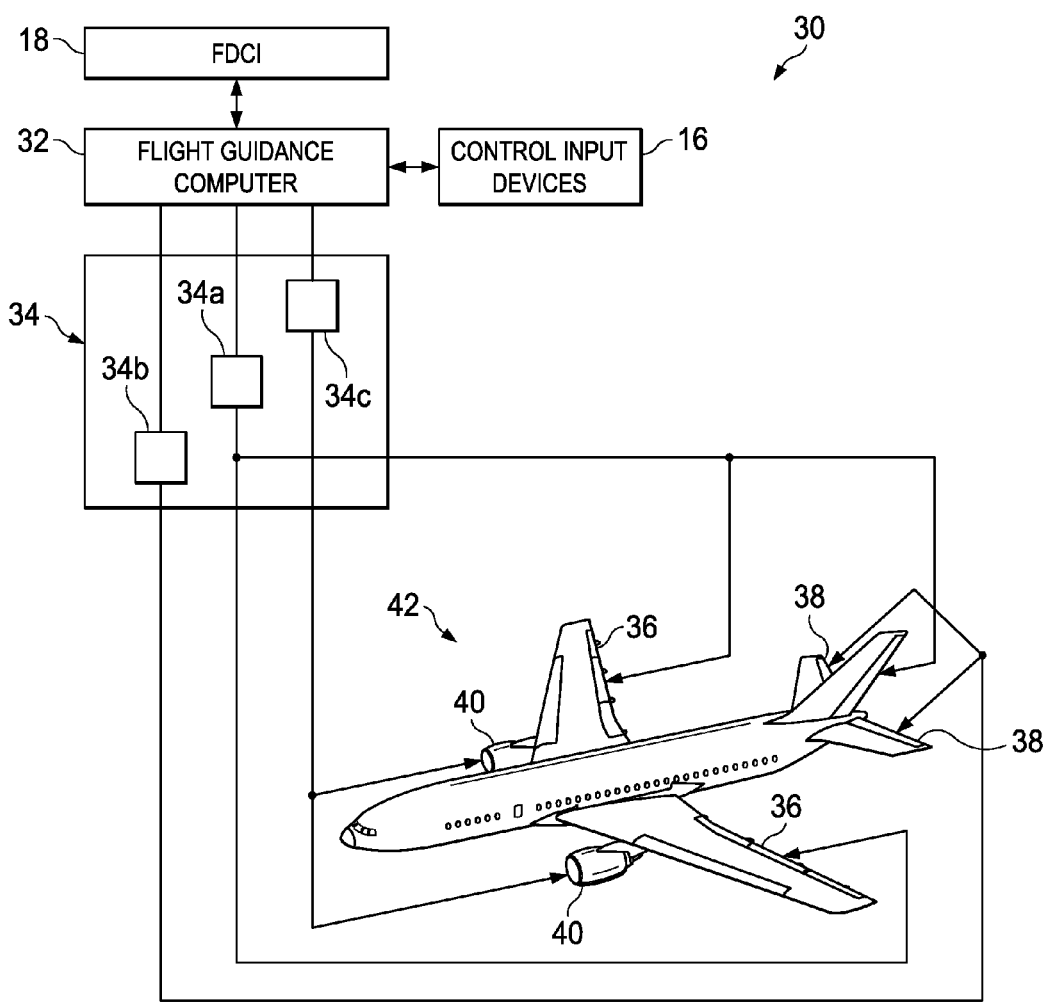
FIG. 2 is an example of an aircraft control architecture that is managed by an FDCI.

Aspects of the flight control system have been described in further detail previously, an example of which may be found in U.S. Pat. No. 7,460,029, entitled "Systems and Methods for Presenting and Obtaining Flight Control Information" and incorporated herein in entirety by reference. For example, as shown in FIG. 2, a flight guidance system 30 that is an embodiment of Aircraft Control System 20 connected to an FDCI system 12, may entail devices such as an FDCI 18, other annunciators (not shown), Control Input Devices 16, a flight guidance computer 32 linked to one or more control systems 34, shown as a lateral/directional control system 34a, a vertical motion or pitch control system 34b, and an airspeed (or autothrottle/engine) control system 34c. The FDCIs 18 may be embodied as cockpit FDCIs 18a such as those shown in FIG. 6A located on the glare shield 56, tray 114, lower center multifunction panel 112, or other FDCI-based cockpit workspace 110 locations. The lateral/directional control system 34a can be coupled to flight control surfaces affecting lateral and directional control 36, which are typically ailerons and/or rudders of the aircraft 42. The vertical motion control system 34b can be coupled to pitch control surfaces 38, which are typically elevators. Lastly, the airspeed controller 34c can be coupled to the engines 40 of the aircraft 42 in some path-based modes of operation, and can be coupled to the elevators in some climb and descent modes of operation.

Pilots, for example, may interact with the Aircraft Control System 20 via FDCI 18 that makes available a number of operator-controllable or operator-activatable functions for pilot input. In this regard, pilots may interact via gestures or touch input to review, modify, or execute functions such as flight management and control functions such as changing speed to affect the speed profile of the aircraft; changing altitude to affect the vertical flight profile; or changing waypoints to change the lateral flight path of their aircraft in real-time or program the change to execute at a later point in time.

Returning to FIG. 1, the Flight Management System (FMS) 14, and its Navigation database (NDB) (not shown) and Aerodynamic and Engine (performance) database (AEDB) (not shown) provide information necessary for navigation along the four-dimensional (4D, including time) flight route for calculating the optimal or desired performance for that flight route. The FMS 14 and its lateral and vertical navigation guidance functions may also utilize information from Navigation System 22, Communication System 24, and Aircraft Flight Control System 20, FDCI system 12, and display flight management information FDCI 18.

The Communications System 24 may also be enabled to uplink and downlink information, for example and without limitation, related to flight plans, Air Traffic Control (ATC) instructions for lateral navigation, vertical navigation, speed changes, required time of arrival at a waypoint, required time of arrival at a destination, weather, or Airline Operational Control (AOC) messages such as those related to gate information and updated time of arrival. It may also be engaged in transmitting and receiving coordination messages between aircraft that are engaged in a collaborative Air Traffic Management (ATM) application such as where one aircraft is asked to follow another aircraft at a certain distance, time, speed and/or altitude parameters.

Another important system in managing FM functions is the Navigation System 22 of the aircraft. Its component systems such as the Global Positioning System (GPS), Distance Measuring Equipment (DME), VHF Omni-Directional Range (VOR), Air Data and Inertial Reference Unit (ADIRU), Air Traffic Control (ATC) Transponders, Traffic Alert and Collision Avoidance System (TCAS) and/or other traffic computers used for Air Traffic Management (ATM) applications provide FM function-related information as related to, for example and without limitation, the navigation or guidance performance of the aircraft in reference to its flight plan, a navigation station or waypoint, or to some objective as set forth by a procedure such as a Continuous Descent Approach (CDA) or a collaborative Air Traffic Management (ATM) application. In this regard, certain ATM applications may be available as part of the Surveillance System 26. Alternative configurations may also embody ATM applications and certain navigation information in a suitably equipped Electronic Flight Bag (EFB) 92, mobile device, or portable FDCI 28 that may interface with the FDCI system 12.

In addition, Control Input Devices 16 are provided to enter, accept, and utilize FM function-related information that is available from, without limitation, a communications uplink from Air Traffic Control (ATC) or an Airline Operational Center (AOC) through the Communication System 24, a paper chart, customized airline-specific approach procedure database, or other on-board aircraft systems such as the Aircraft Control System 20, the Flight Management System 14, the Navigation System 22, or the Surveillance System 26. The Control Input Devices 16 may also be utilized to affect the information displayed on the FDCI system 12 in a manner generally similar to that described in U.S. Pat. No. 7,418,319, entitled "Systems and Methods for Handling the Display and Receipt of Aircraft Control Information" and incorporated herein in its entirety by reference.

Lastly, in preferred embodiments, the Control Input Devices 16 may be physically and functionally integrated with one or more FDCIs 18. However, where such integration is not desired or feasible, the Control Input Devices 16 may be also embodied as a dedicated control panel or as part of another control input device on the aircraft. For example, and without limitation, the control input devices 16 may be integrated as part of the Control Display Unit (CDU) 96, or as part of another control panel for controlling flight management, navigation or display aspects of the system of the aircraft. Further, the control input the devices 16 may include, without limitation, voice command input means, keyboards, cursor control devices, touch-screen input and line select keys (LSK), or other keys on a CDU 96.

The above detailed description is intended to describe one embodiment of this disclosure, and in no way limit the scope of the disclosure. While the system configuration depicted in FIG. 1 can be designed to have each of the systems interact with each other in a variety of ways, it must in the end advance the objective of reconfiguring the cockpit in real-time. The FDCI system 12 is configured to optimally bring together all cockpit interaction-related aspects of the aforementioned systems as described below.

Figure 3:
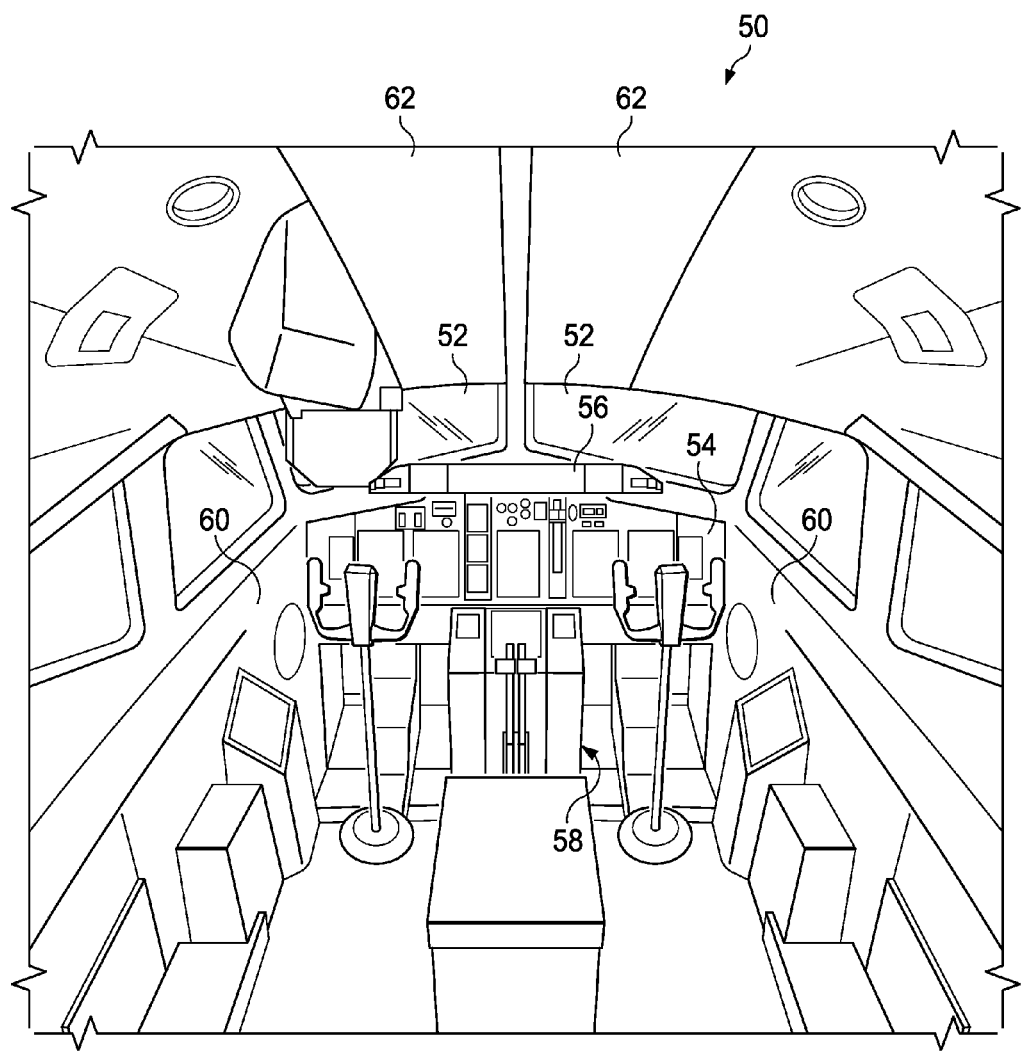
FIG. 3 illustrates a general arrangement of a cockpit showing several cockpit locations that can accommodate FDCIs.
Figure 4:
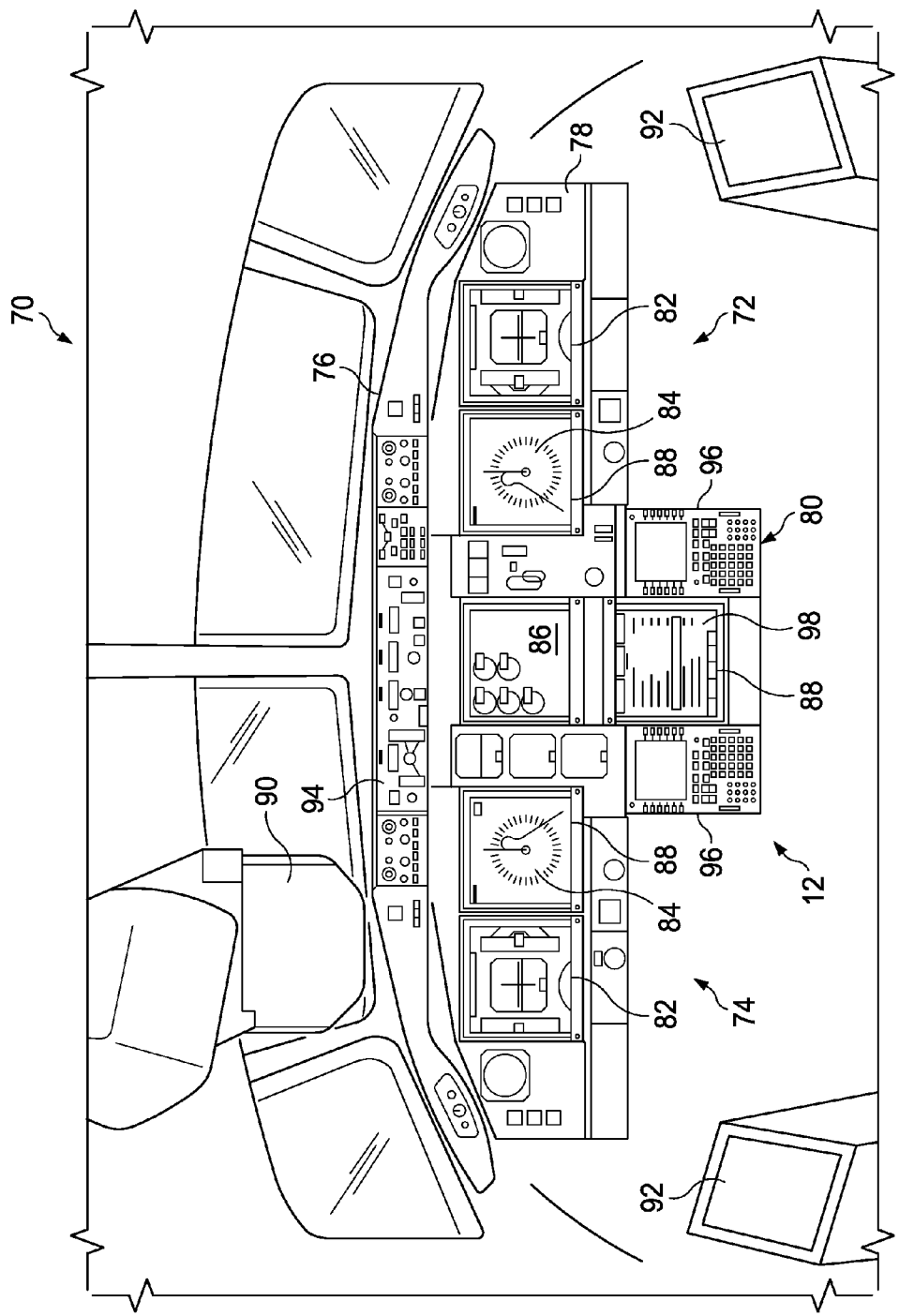
FIG. 4 is a diagram illustrating a more detailed arrangement of cockpit instruments that are managed by the FDCI system.

FIG. 3 illustrates a general arrangement of an aircraft cockpit 50 showing a layout of many of the aircraft cockpit 50 locations that can potentially accommodate the FDCIs 18, aspects of which are shown in further detail in FIG. 4. The cockpit 50 includes forward windows 52, a plurality of flight instruments on the forward instrument panel 54, a glare shield 56, a control pedestal 58, sidewalls 60, and overhead panel 62. In preferred embodiments, substantially all of the forward instrument panel 54, the glare shield 56, the control pedestal 58, the sidewalls 60, and the overhead panel 62 can host FDCIs 18.

FIG. 4 shows a close-up view of a cockpit 70 with a glare shield 76, a forward instrument panel 78, and a control pedestal 80 with various instruments 72 and displays 74. The forward instrument panel 78 and the control pedestal 80 have a number of displays, including Primary Flight Displays 82, Crew Alerting Display 86, and multifunction displays 88. As shown here, the multifunction displays 88 include a Navigation Display 84 and a Checklist Display 98. The multifunction display 88 on the control pedestal 80 may also be configured to manage datalink communications or other cockpit functions. In addition, the cockpit has a Head-up Display 90 (an optional, second Head-up display is not shown), a Control Display Unit (CDU) 96, and an Electronic Flight Bag display 92. Lastly, a Mode Control Panel (MCP) 94 is positioned on the glare shield 76. In various embodiments, all of the aforementioned systems having display and control features can be managed by the FDCI system 12 and replaced by FDCIs 18.

As stated earlier, one aspect of the challenge is therefore how to manage and control the different states of a cockpit configuration having multiple cockpit FDCIs 18*a*, each potentially having multiple system-level FDCIs 18*b*. In a preferred embodiment, such management and control functions may be implemented by an FDCI system 12 that is connected to FDCI 18 (as shown in FIG. 1) and that stores the functional configuration of all system-level FDCIs 18*b* that can be made available in the cockpit, a non-limiting and simplified example of which is shown in FIG. 5.

Figure 5:
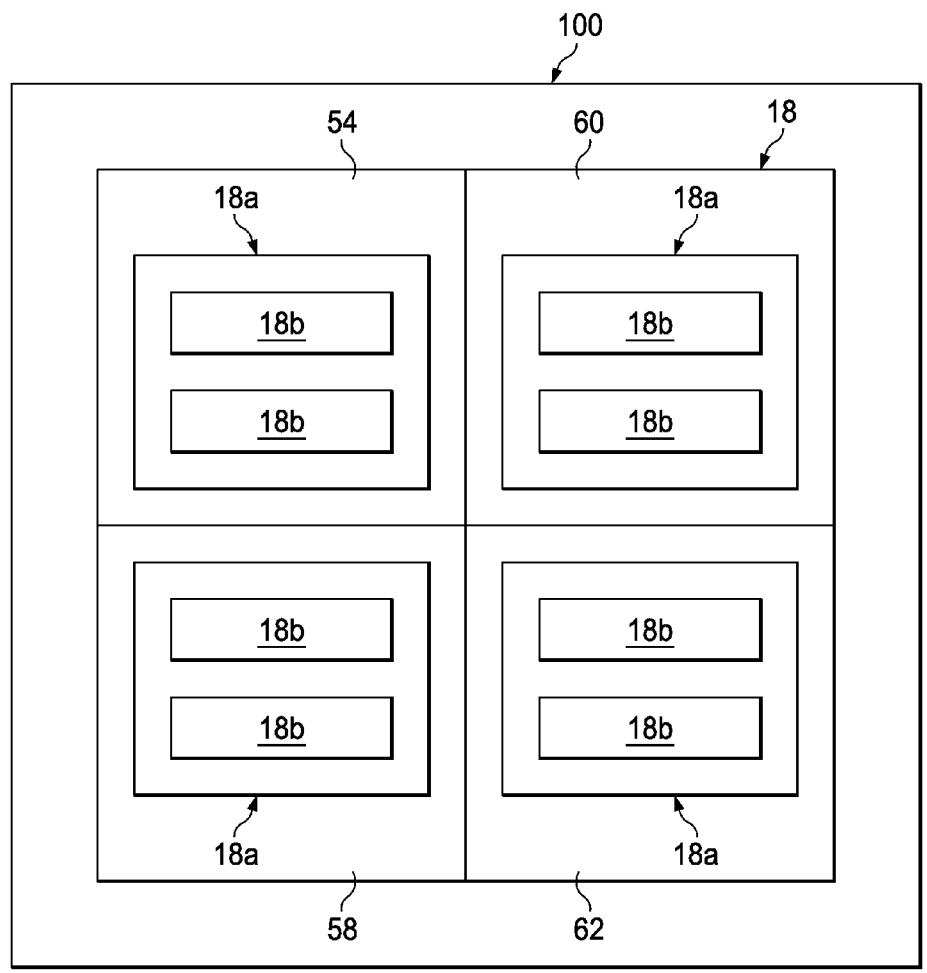
FIG. 5 depicts a schematic of one embodiment of a network of FDCIs in an aircraft cockpit.

In the example shown in FIG. 5, the set of Cockpit FDCIs 18*a* of an FDCI-based cockpit workspace 110 such as shown in FIG. 6A may be implemented as a single networked FDCI 18 whose subnetworks and components include cockpit FDCIs 18*a* and system-level FDCIs 18*b* located in various parts of the cockpit. For example, the FDCI system 12 may manage the entire set of FDCI 18 by partitioning the FDCI 18 into a set of forward instrument panel 54 cockpit FDCI 18*a*, control pedestal 58, cockpit FDCI 18*a*, sidewall 60 cockpit FDCI 18*a*, and overhead panel 62 FDCI 18*a*. Similarly, the network of FDCIs may be divided into subnetworks (not shown) such as a subnetwork of cockpit FDCIs 18*a* on the forward instrument panel 54, a subnetwork of FDCIs 18*a* on the control pedestal 58, a subnetwork of FDCIs 18*a* on the overhead panel 62, and in addition, another subnetwork (not shown) of portable FDCIs 28 wirelessly connected to the FCDI system 12.

As the FDCI system 12 is connected to all cockpit FDCIs 18 as discussed earlier in reference to FIG. 1, the FDCI system 12 can be enabled to store, keep track of, and maintain the configuration states of each cockpit FDCI 18 such as with respect to the functions (including system-level FDCI 18*b*) hosted on each cockpit FDCI 18*a*. For example, the FDCI system 12 can keep track of a cockpit FDCIs 18 such as a control pedestal 58 FDCI hosting system-level FDCIs 18*b* such as an aircraft control system FDCI, a communications system FDCI, and a flight management system FDCI each of which would take a portion of a control pedestal 58 FDCI. The FDCI system 12, by keeping track of the current state of each system-level FDCI 18*b*, admits the options of centrally managing the transfer of a particular system-level FDCI 18*b* from, for example, a control pedestal 58 location to a forward instrument panel 54 location.

Accordingly, the FDCI system 12, for example, using its stored functional configuration information and the current configuration states of system-level FDCIs 18*b* such as a keyboard 208 (shown in FIG. 9), can allocate one or more keyboards 208 to one or more cockpit FDCI 18*a*, keep track of how many copies of the keyboard 208 are assigned to cockpit FDCIs 18*a*, and maintain, add, remove, or otherwise modify the various copies of the keyboard 208 in the cockpit. In this example, stored configuration information corresponds to the types of available keyboards (QWERTY, ABCDE, French, etc.) for flight crew selection and the current configuration state corresponds to the current configuration of the keyboard such as a keyboard whose keys are arranged in a QWERTY (English) configuration as opposed to another available configuration.

Central management of the FDCI systems 12 of all the cockpit FDCIs 18*a* and the system-level FDCIs 18*b* that they host enables a number of functions related to real-time cockpit reconfiguration. For example, the FDCI system 12 may be enabled to sense the position, orientation, and current functional configuration of a particular FDCI in relation to all other cockpit FDCIs 18*a* and allow or disallow the display of certain functions on that particular FDCI. In another example, the FDCI system 12 may monitor whether a function such as a primary flight display (PFD) 82 or a navigation display (ND) 84 is presented on at least one suitably configured FDCI 18 at all times during a flight, and should the flight crew inadvertently attempt to configure the forward instrument panel FDCIs 18 without an ND 84, it may override the flight crew input and disallow the configuration.

In a preferred embodiment, the FDCI system 12 may also process aircraft state information provided by the systems with which it interfaces (as shown in FIG. 1), including but not limited to speed, altitude, turbulence, and other disturbances, and adjust adaptively and dynamically thresholds for touch recognition and/or increase button/control sizes to improve hit accuracy. The FDCI system 12 may also process aircraft intent information as well as phase of flight information. For example and not limitation, FDCI system 12 may allow or disallow certain functions such as a reconfiguration of the forward displays during an approach or a takeoff.

In another preferred embodiment, the FDCI system 12 may process aircraft information such as traffic information or datalink information and automatically enlarge or highlight the associated traffic surveillance system-level FDCI 18*b* or datalink communication system-level FDCI 18*b* on the cockpit FDCI 18*a* located on the control pedestal 58.

The on-board aircraft communications network that connects the FDCI system 12, cockpit FDCIs 18a, and other aircraft systems as shown in FIG. 1 (including but not limited to the Flight Management system 14, Aircraft Control System 20, Navigation System 22, Communication System 24, and Surveillance System 26) may be, for example, wireline, optical, or wireless or a combination of the above, and is not intended to be limited to a particular network topology or network protocol. In one distinct embodiment, aircraft systems communications to cockpit FDCIs 18a may be routed to a central FDCI system 12 or computer that reroutes the information to the cockpit FDCI 18a configured to receive it. In this embodiment, communication from the cockpit FDCIs 18a to the aircraft systems such as a Flight Management System 14 or a Communications system 24 may also be routed via the FDCI system 12.

In another distinct embodiment, aircraft systems communications to cockpit FDCIs 18a may be routed directly to the cockpit FDCI 18a configured to receive it. Transmission of information from the cockpit FDCIs 18a back to the aircraft systems of FIG. 1 may also be routed directly. In this embodiment, the FDCI system 12 may monitor the aforementioned direct communications to and from the aircraft systems and utilize information needed to supervise cockpit configuration information.

In yet another distinct embodiment, the communications network may be a hybrid of the first two embodiments discussed above, where some aircraft system-level FDCI 18b communications may be centrally managed by the FDCI system 12 and some other aircraft system-level FDCI 18b communications may be directly routed to the cockpit FDCI 18b. For example, communications with portable FDCIs 28 or dockable cockpit FDCIs 18a with wireless connections may be configured to send and receive information from the various aircraft systems only via the FDCI system 12 and non-portable cockpit FDCIs 18a such as the ones on the control pedestal 58 (see FIG. 6A) may send and receive information directly to and from the various aircraft systems without the information being route via the FDCI system 12.

Thus, the FDCI system 12, by centrally managing the pilot-to-aircraft and aircraft-to-pilot interface allows for the real-time reconfiguration and movement of functions to and from various cockpit locations in a manner suitable for the flight crew function and flight operating conditions at hand. A natural extension of this FDCI system 12 enabled central management of crew interfaces is that the FDCI system 12 also admits other related, distinct embodiments such as implementations that transmit FDCI information to an off-board FDCI such as an FDCI located at an Airline Operational Center (AOC) to allow monitoring, and potentially partial control, from the ground.

Cockpit Reconfiguration

Having the FDCI system 12 centrally manage the pilot-to-aircraft and aircraft-to-pilot interaction enables a solution for the second aspect of this disclosure: real-time cockpit reconfiguration. One aspect of real-time cockpit reconfiguration, as previously described, involves the reconfiguration of the interfaces to adjust adaptively and dynamically thresholds for touch recognition and/or increase button/control sizes to improve hit accuracy as a function of aircraft state information.

A second important aspect of real-time cockpit reconfiguration involves the cockpit workspace itself by the flight crew. Real-time cockpit reconfiguration by the flight crew makes possible more optimal use of their cockpit workspace for the task at hand in terms of, for example and without limitation, better ergonomics and a better arrangement of the workspace for collaborative tasks. Furthermore, it makes the cockpit workspace substantially more multifunctional as certain locations such as the control pedestal 58 and tray 114 can be used for FDCI functions as well as desktop functions.

FIG. 6A, depicts an embodiment of a generalized FDCI-based cockpit workspace 110 showing Cockpit FDCIs 18a located on the forward instrument panel 54, the control pedestal 58, the glare shield 56, the overhead panel 62, the lower center multifunction panel 112, and the tray 114 location in front of the seats 118 as extended by the robot arm 116. Throughout this disclosure, the robot arm for the right hand of the cockpit is stowed and is not shown. FIG. 6A has been simplified in order to make it easier to understand the present disclosure, and for example, the tray configuration for the right hand seat as well as features and functions such as the throttle quadrant, landing gear levers, and other features and functions, as well as functions resident on the cockpit FDCIs 18a are not shown. Those skilled in the art will appreciate that FIG. 6A is one configuration of many that can be implemented for an embodiment of an FDCI-based cockpit architecture.

As FDCIs 18 are generally thinner compared to currently available control panels that may have depths of 1-4 inches or more and because communications with FDCIs can be on a wired or wireless aircraft network to and from the FDCI system 12 as opposed to dedicated wire bundles to and from each system control panel to its associated aircraft computer (e.g., Line Replaceable Unit (LRU)), FDCIs require reduced structural support/housing as well as save considerable cockpit space and weight. They can be mounted on moveable platforms, robotic arms, or other motion-imparting devices in the cockpit so as to allow increased configuration flexibility that pilots can take advantage of in real-time. In some embodiments, the FDCIs 18, or more particularly, cockpit FDCIs 18a, can be attached to or removed from (i.e., removably couplable) to an end effector of a robotic arm or end-effector bezel of a robotic arm.

In preferred embodiments, the motion-imparting devices may be configured as robotic arms 116. Robotic arms 116 also offer a more accessible and simpler description of this disclosure and will be used as examples in the discussion below. Those skilled in the relevant art will appreciate that designers have many options to address properties of robotic arms 116 such as size, arrangement of links, number and types of robotic joints, actuators, sensors, and other properties. related to the mechanics and control of robotic arms 116 and as influenced by factors such as the FDCI-based cockpit workspace 110 and the intended function of the robotic arm 116. In addition, designers have various options in electing coordinate systems and reference frames with which the kinematic and dynamic characteristics of robotic arms 116 may be addressed.

Those skilled in the relevant art will further appreciate that key to real-time cockpit reconfiguration is the ability to track the different states of the FDCI-based cockpit workspace 110 configuration in real-time. In order to keep track of such configuration in real-time, one needs to know the configuration—that is, position and orientation information (such as a position vector and rotation matrix with respect to a cockpit reference frame)—of motion imparting devices such as robotic arms 116. The kinematic configuration of the robotic arms (manipulators), and in particular the location of the end-effector portion of the robotic arms, is well understood as a basic function of the mechanics and control of robot manipulators. See J. Craig, *Introduction to Robotics*, Addison Wesley (1989). Accordingly, those skilled in the relevant art can easily apply the configuration information of the robotic arm 116 to the cockpit FDCI 18a rigidly attached to the end-effector portion of the robotic arms to calculate the configuration—that is, the position and orientation of the attached cockpit FDCI 18a—with respect to the cockpit workspace 110. Thus, by keeping track of the configuration information of each cockpit FDCI 18a attached to each cockpit robotic arm 116, the FDCI system 12 can keep track of the different states of the FDCI-based cockpit workspace 110 configuration in real-time.

Figure 6B:
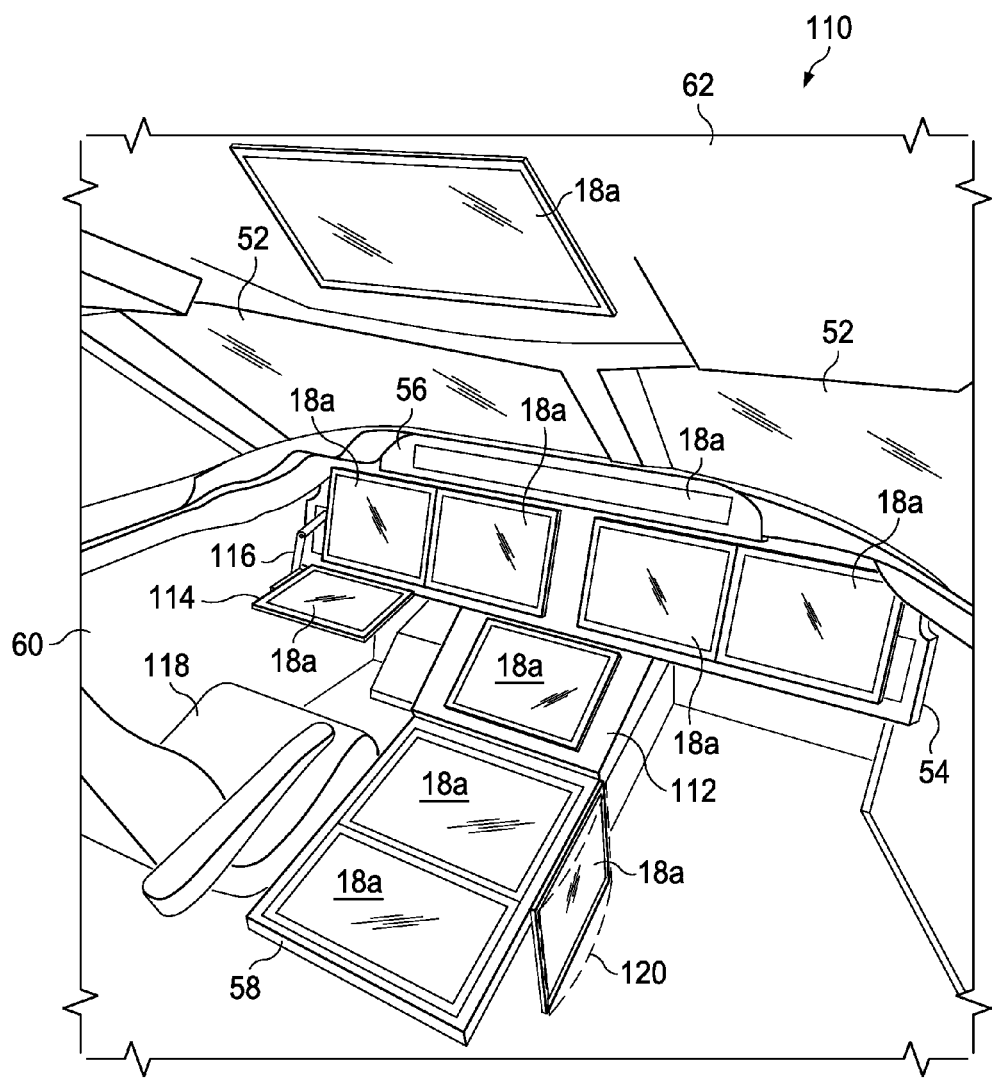
FIG. 6B illustrates another embodiment of an FDCI-based cockpit.

In yet further embodiments, as shown in FIG. 6B, FDCIs 18 such as the ones on the control pedestal 58 may also be stowed on either side of the control pedestal 58 stowage (pocket) location 120 so as to reconfigure the flat space as a deskspace or space to put papers and meal trays. In some other embodiments, suitably configured FDCIs 18 that are neutral to the placement of papers and trays (e.g., non-resistive touch screens, resistive touch screens that can accurately distinguish a finger from another object based on size, pressure, etc.,) may be used without being moved to the stowage location 120. In other embodiments, the FDCIs 18 may be disabled via pilot selection, position/proximity sensors, or other means, to lock out input so as to allow objects to be placed on the FDCIs 18 (e.g., food trays, papers, books, etc.) without activating display-based controls. Alternatively, the stowage location 120 may also be used to place FDCI covers for the control pedestal 58 cockpit FDCIs 18a, for example, for use with papers or meal trays.

Turning now to FIG. 7, another FDCI-based cockpit workspace 130 is depicted with a number of cockpit FDCIs 18a on the forward instrument panel 54, the sidewalls 60, the lower center multifunction panel 112, and the control pedestal 58 positions. In this preferred embodiment, as the FDCIs 18 are thin devices, the control pedestal 58 and its related support structure shown in FIG. 3 substantially covering the center portion of the cockpit between the two pilots' seats (not shown), can be replaced by one or more robotic arm having for example, prismatic, rotary or spherical joints or other motion-imparting device at suitable aft and/or forward locations. Referring now again to FIG. 7, a robotic arm (not shown) underneath the control pedestal 58 FDCIs 18a can be configured to have a base portion on the cockpit floor and an end-effector portion (e.g., an end portion to support the FDCI) attached under the control pedestal 58 FDCIs 18a, so as to allow the raising and lowering of the control pedestal 58 FDCIs 18a to ergonomically optimal heights for the flight crew. Such a reconfiguration of the control pedestal 58 portion of the FDCI-based cockpit workspace 130 opens up space below the control pedestal 58 FDCIs 18a such that the pilot and copilot can rotate their seats 118 (seat track and other details are not shown) and collaboratively work on the control pedestal 58 FDCIs 18a just as if they are working on a desk in an office. For example, the crew can configure the control pedestal 58 for such collaborative work for their preflight or post-flight tasks, and for the rest of their duty time when the pilots are facing forward, the height can be lowered such that the controls are easy to reach and manipulate from a forward-facing position. In this embodiment, the control pedestal 58 location can also support extensions, such as tray extensions 132 that may be used by other flight crew.

In this regard, in addition to pilot-to-aircraft and aircraft-to-pilot interfaces and associated real-time reconfigurations enabled by the FDCI system 12 discussed above, FDCI-based cockpit workspace 130 reconfigurations, such as the reconfiguration of the control pedestal 58 location, enables better pilot-to-pilot interface and collaboration, including collaboration with crew members such as relief pilots and check pilots.

Figures 8A, 8B, 8C:
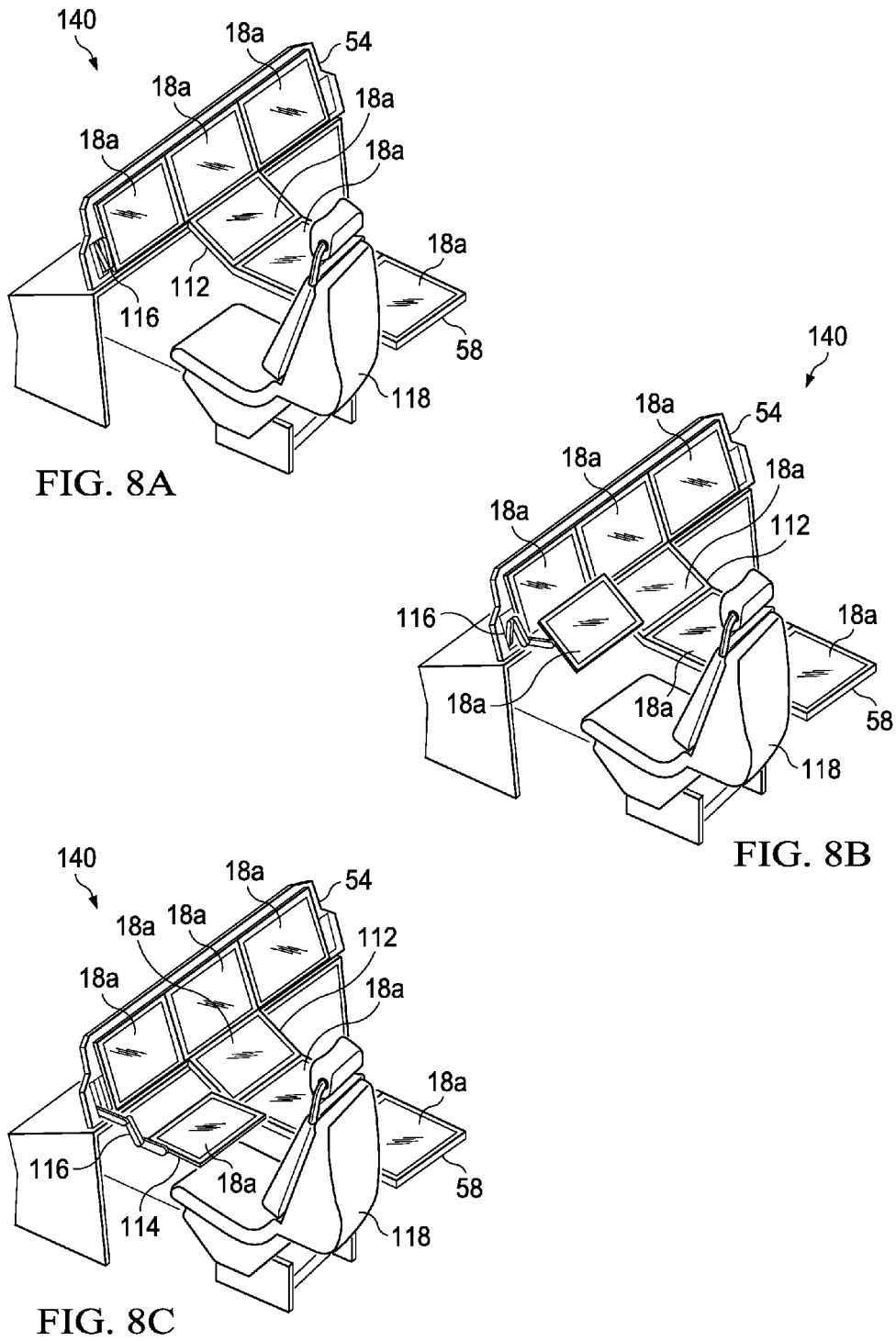
FIGS. 8A-8C show depictions of forward display reconfigurations, including a tray display configuration.
Figure 9:
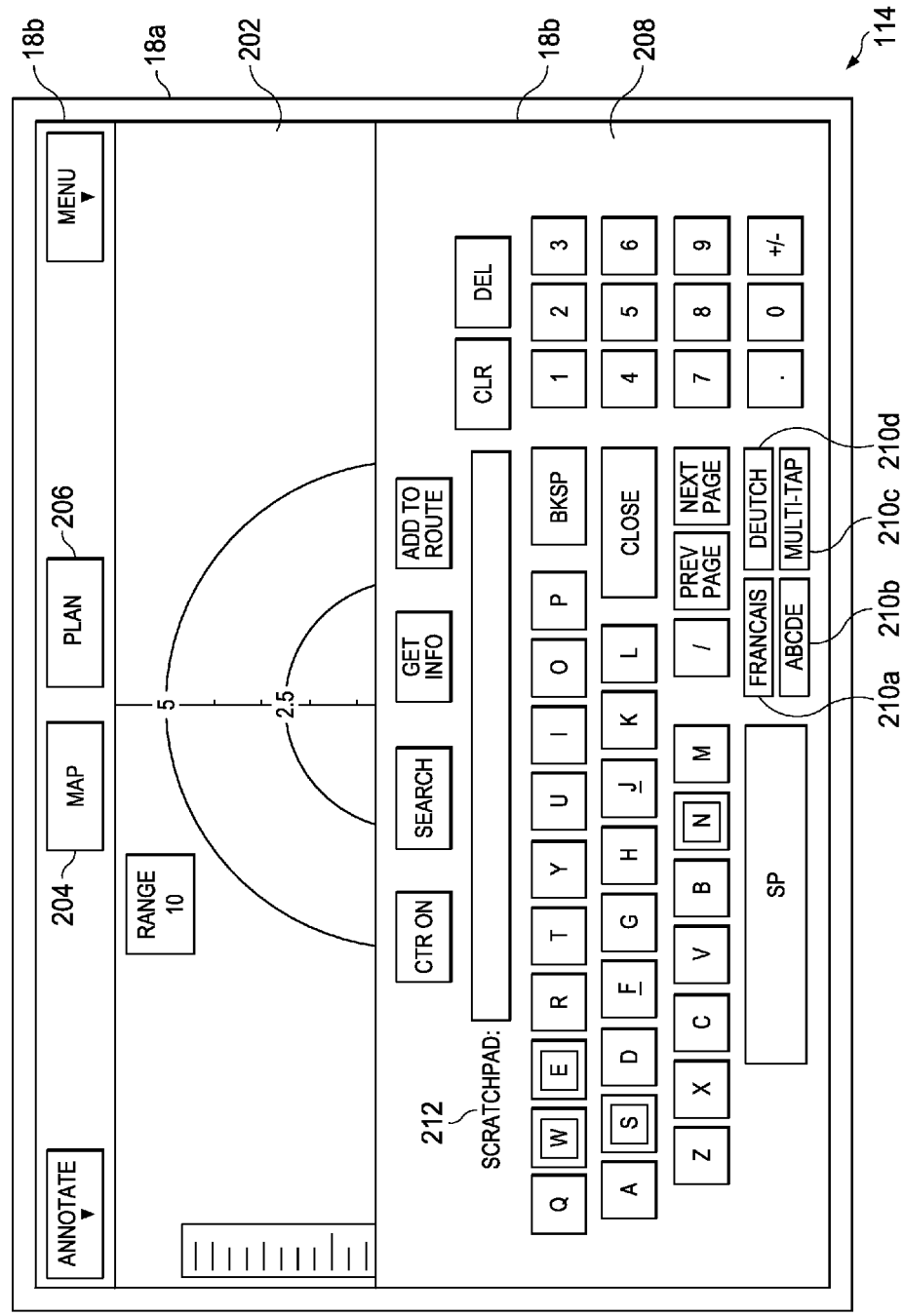
FIG. 9 is an example of an FDCI at a tray location that is configured to provide a navigation map display and keyboard.

Turning now to FIG. 8, another embodiment of an FDCI-based cockpit workspace 140 admits a new display location—the tray 114 location—that was not available in previous generation aircraft. As shown in FIGS. 8A-8C, the tray 114 cockpit FDCI 18a is a moveable cockpit FDCI 18a attached to a robotic arm 116 that slides out of the forward instrument panel 54 thus exposing a second forward instrument panel cockpit FDCI 18a that takes on forward display functions. Based on configuration options, the moveable cockpit FDCI 18a, at a suitable point in the reconfiguration to a lock-down horizontal position, may take on additional capabilities such as keyboard functions as shown in FIG. 9.

Various types of motion-imparting devices may be implemented for any moveable cockpit FDCIs 18a such as those at the tray 114 and control pedestal 58 locations and the embodiments described in this disclosure are provided as examples and in no way limit the disclosure. Those skilled in the relevant art will further appreciate that it is the configuration information of the cockpit FDCIs 18a such as the position of the moveable FDCI 18 that is provided by the motion-imparting devices that are key to the real-time cockpit reconfiguration and not the particular choices of the motion-imparting devices themselves.

In a preferred embodiment, the moveable cockpit FDCI 18a may include a motion-imparting and stowing mechanism such as a robotic arm 116 with two or more degrees of freedom so as to allow the tray display to tilt up and forward to align in front of the forward display; to move out of the forward instrument panel for closer viewing; to move out and tilt up for more ergonomic touch or screen interaction; to move sideways; and to lie flat for keyboard functions or to simply function as an alternative desk space. In this embodiment, the moveable cockpit FDCI 18a may also have a camera near one of its edges so as to enable video conferencing with other cabin crew, flight crew who may be at a crew rest station, or even airline ground crew.

The robotic arm systems in the cockpit such as the one for the moveable cockpit FDCI 18a that comes out of the forward instrument panel 54, the control pedestal 58 FDCI 18, and optionally the sidewall 60 and overhead 62 FDCIs 18 may be controlled by one or more control apparatus. For example, a multi-position control switch, upon selection of a switch position, commands the robotic arm to move the moveable cockpit FDCI 18a to a cockpit workspace 140 location (i.e., position and orientation) corresponding to the selected switch position.

Other examples of control apparatus include haptic devices manipulable by the flight crew to position and orient the FDCIs 18 as desired. Such haptic devices for positioning and orienting moveable cockpit FDCIs 18a may be implemented by, for example, a haptic handle such as that described in U.S. Pat. No. 7,885,732, entitled "Systems and Methods for Haptics-Enabled Teleoperation of Vehicles and Other Devices", and incorporated herein in its entirety by reference. Such implementation can be beneficial to the flight crew by, for example and without limitation, giving haptic feedback when the FDCI 18 in motion reaches certain pre-defined configurations that are optimized for particular tasks such as gesturing on maps, video-conferencing, or typing on a virtual (touch-based) keyboard.

Examples of robotic arm system configurations include a robotic arm disclosed in U.S. Pat. No. 7,967,549, entitled "Robotic System Including Foldable Robotic Arm"; and a robot manipulator disclosed in U.S. Pat. No. 6,995,536, entitled "Low Cost Robot Manipulator", both of which are incorporated herein in their entirety by reference. Those skilled in the relevant art will further appreciate that the robotic arm can be implemented in various configurations and the disclosure can be practiced in other robotic arm configurations than discussed in the aforementioned configurations.

In preferred embodiments, the robotic arm 116, including systems and devices controlling it, are communicatively connected to the FDCI system 12 and provide to the FDCI system 12 location (i.e., coordinate) information of the end-effector portion attached to the moveable cockpit FDCI 18a with respect to the cockpit workspace 140, and optionally with respect to the joint space of the robotic arm. Thus, the FDCI system 12 can obtain precise information as to the position and orientation of the moveable cockpit FDCI 18a attached to the end-effector of the robotic arm. The FDCI system 12 can then utilize the position and orientation information and allow or disallow certain functions from being available on the moveable cockpit FDCI 18a; configure functions to be displayed on the moveable cockpit FDCI 18a; transfer functions that are on the moveable cockpit FDCI 18a to other cockpit FDCI 18a; turn off functions on the moveable cockpit FDCI 18a so as to have it function as a desktop or tray workspace; and perform motion planning for moving the moveable cockpit FDCI 18a to its next configuration.

In yet other distinct embodiments or in degraded modes of operation, the tray 114 cockpit FDCI 18a may be moveable manually by the pilots using a number of its features such as wrist rests, handles on the edges, raised edges, and grips around bezels.

The moveable cockpit FDCI 18a may also utilize accelerometer-based or gyro-based tracking to transmit back to the FDCI system 12 its position and orientation information as well as vibration information in the cockpit workspace. Such feedback may also be used to measure and augment other aircraft system inputs that measure or estimate turbulence levels and use software to adaptively and dynamically increase thresholds for touch recognition and/or increase button/control sizes to improve hit accuracy on the moveable FDCI 18.

Flight Crew Interactions

The FDCI system 12 and the real-time cockpit reconfiguration discussed above better enable flight crew interaction with the aircraft using "touch" events and gestures. Because aircraft state information and cockpit configuration information are available to the FDCI system 12, it can use them to optimally configure crew interfaces such as system-level FDCIs 18 suitable to the crew task at hand or to match crew preferences.

FIG. 9 depicts a flight deck configuration 200 of a cockpit FDCI 18a at the tray 114 location configured with two system-level FDCIs 18b: a partial navigation display 202 having map mode 204 and plan mode 206 and a keyboard 208. The keyboard 208 can accept for alphanumeric text entry via touch input and the navigation display 202 can also accept touch input. The keyboard 208 allows for keyboard layouts as selected by keyboard layout buttons 210a-210d to be displayed (QWERTY, ABCDE, non-English such as French and German, multi-tap, etc.,) including application-specific layouts such as shown in FIG. 9 where, for example, an FMC scratchpad 212 is made available. The keyboard 208 is implemented in software on a multi-touch display that is capable of registering multiple simultaneous finger presses (i.e. "touch" events). The software implementation exploits multi-touch capability called "multi-touch-enhanced single touch" to significantly improve usability and keyboard performance over a single-touch implementation. The advantage comes from the key presses being triggered on down events only, regardless of how long a finger stays down on a particular key. Thus, there is no latency associated with the system waiting for the finger to be lifted in order to interpret the subsequent key press, as would otherwise be observed with a typical single-touch implementation.

Another item of note is the method by which the keyboard 208 system-level FDCI 18b is initiated. The FDCI 18 and its gesture recognition software are able to interpret multiple simultaneous finger inputs (i.e. "gestures"). Therefore, a particular gesture can be assigned to open the keyboard 208 from within any other system-level FDCI 18b. In some embodiments, a "six or more finger down" gesture may be accepted to indicate that the user wished to begin a typing task such that when six or more touches (6-10 fingers) are detected on the display, the keyboard 208 is initiated. Alternatively, touching any designated text-entry field within system-level FDCI 18b can also trigger the keyboard 208 to open.

Figure 10:
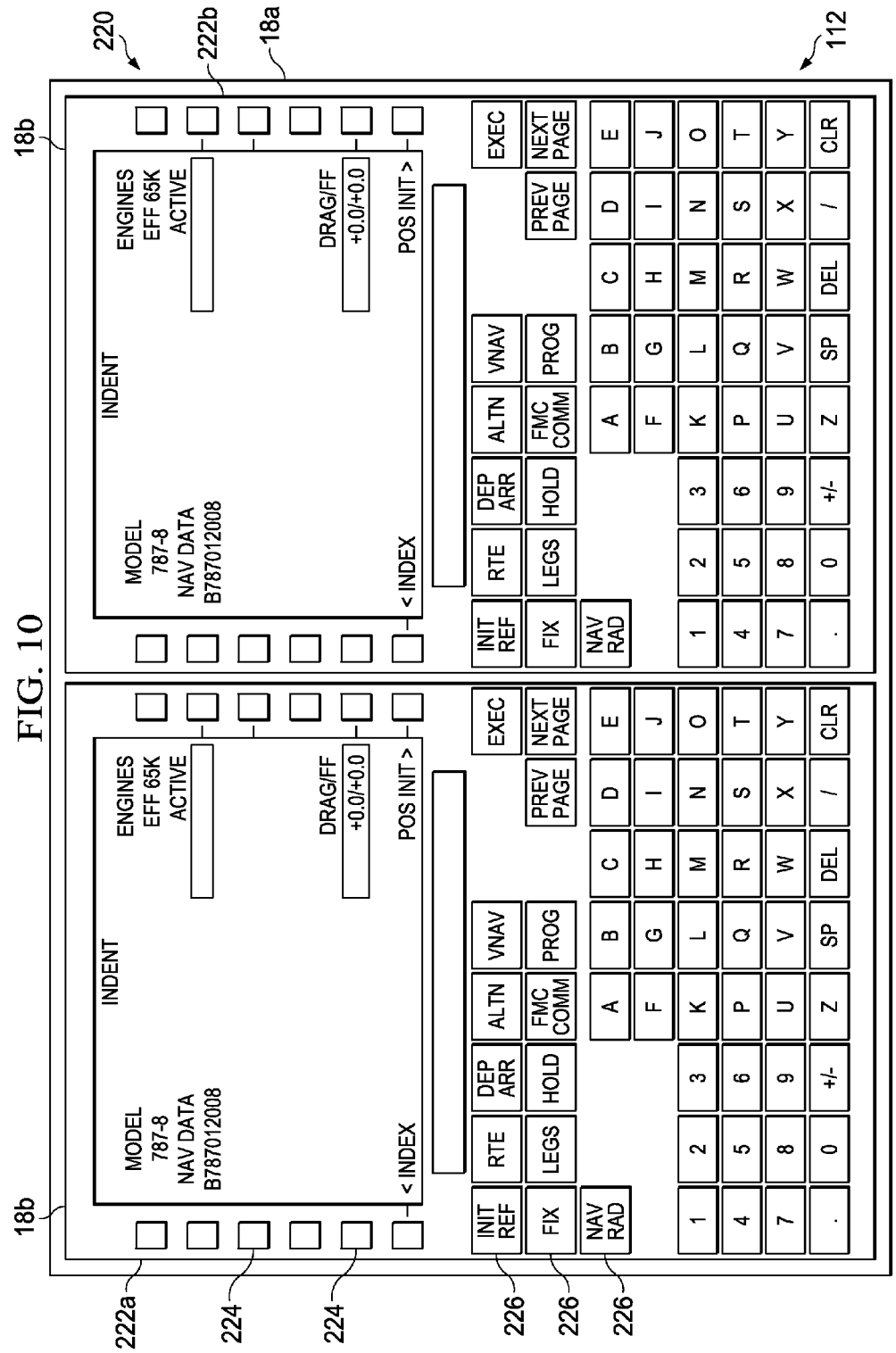
FIG. 10 is a diagram of a touch-based control display unit (TCDU) hosted on an FDCI located at a lower center multifunction panel location.

The FDCI-based cockpit also imparts additional capabilities such as shown in FIG. 10 to, for example and without limitation, the lower center multifunction panel location 112. In the embodiment 220 of FIG. 10, the lower center multifunction panel location 112 may host a single cockpit FDCI 18a with system-level FDCI 18b configured as a two-user touch-based control display unit (TCDU) 222a-222b that accepts direct touch input. Aspects of the TCDU 222a-222b such as the key layout, line select keys (LSK) 224, and menu select keys (e.g., INIT REF, RTE, LEGS, etc.) 226 are not discussed in detail as those skilled in the relevant art are familiar with their operation and further descriptions are available in, for example, U.S. Pat. No. 7,418,319.

Each half of the TCDU 222a-222b can be used by the pilots one at a time or simultaneously. Simultaneous pilot operation on a single centrally-located cockpit FDCI 18a is enabled by the hardware (e.g., a multi-touch or dual-touch touch screen) as well as software code that can virtually partition the cockpit FDCI 18a into suitable smaller FDCI regions such as shown in FIG. 10 to host the TCDU depicted as a left and right TCDU 222a-222b. Accordingly, the cockpit FDCI 18a recognize, accept, and process input from both the pilot and co-pilot and transmit the pilot interaction to the FDCI system 12 and other aircraft systems with which it interfaces.

In some embodiments, simultaneous pilot operation on a single centrally located cockpit FDCI 18a is also enabled by a method for determining which pilot is touching which side of the partition. For example, any "camera-based" touch screen or motion tracking technology would be capable of sensing the arm positions of the pilot and orientations above the screen and would be able to recognize via software, which arm of the pilot is connected to the finger(s) that are making the inputs. This capability is useful for correcting or ignoring accidental input along the edge of a cockpit FDCIs 18a virtual partition.

Thus, the FDCIs 18 ability to allow partitioning such that the same application (e.g., left and right TCDUs 222a-222b) or different applications (e.g., partial navigation display 202 and keyboard 208) can be hosted. The ability to process more than one simultaneous input has imparted increased utility to the lower center multifunction panel location 112 and increased efficiency to the flight crew.

Figure 11:
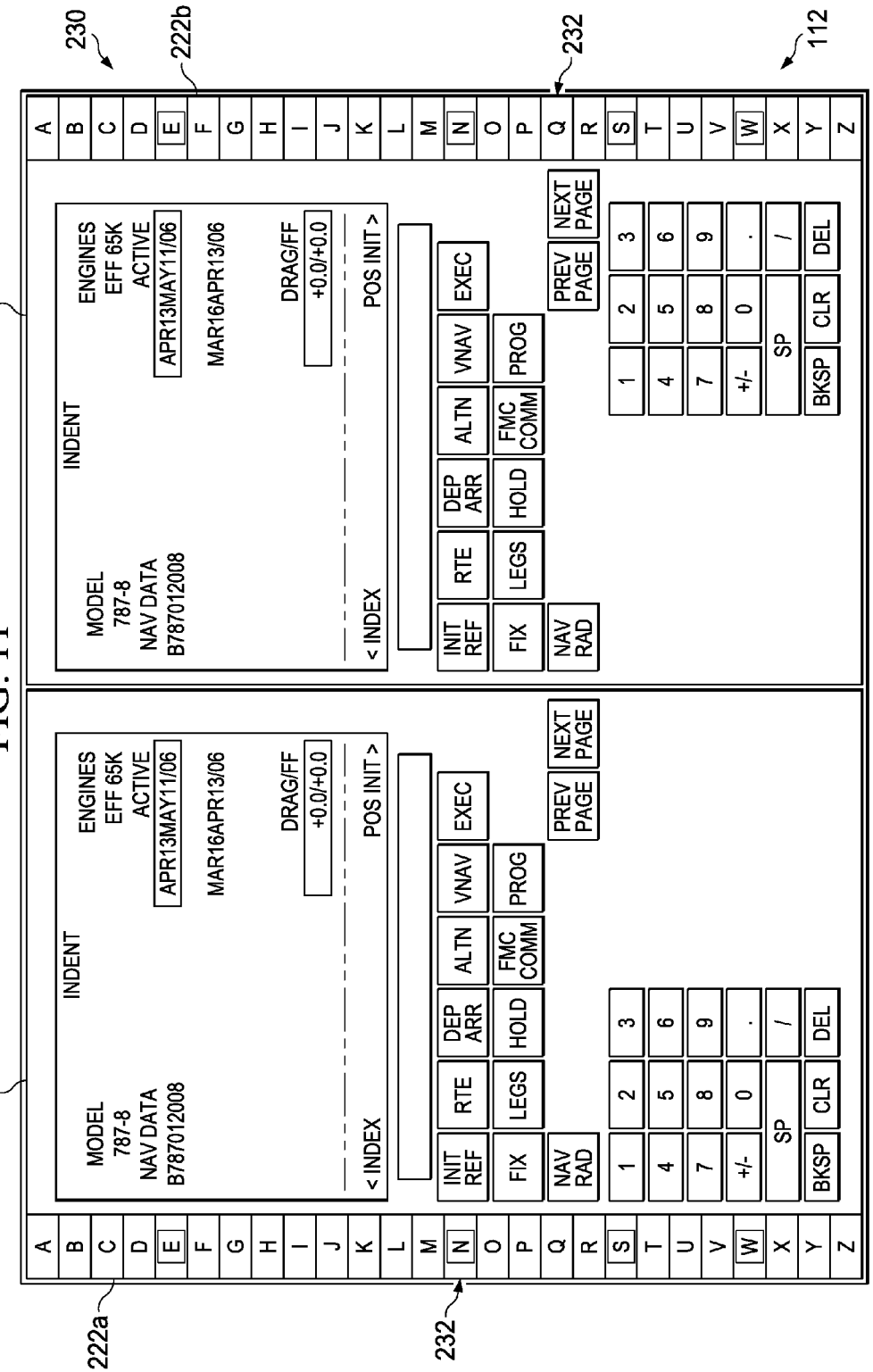
FIG. 11 is an example of a different configuration of TCDUs hosted on an FDCI located at a lower center multifunction panel location.

As with the keyboard 208, the FDCI-based implementation of the TCDU 222a-222b allows a more flexible display and arrangement of keys to accommodate alternative layouts such as a QWERTY implementation as shown in FIG. 9 or a vertical ABC arrangement 232 in yet another embodiment 230 as shown in FIG. 11. Alternative layouts could optionally be made pilot-selectable as enabled by keyboard layout buttons 210*a*-210*d*. Additionally, airline-modifiable options may allow yet further reconfigurations that are not pilot-selectable during, for example, maintenance work. Note also that the line-select keys (LSKs) 224 of FIG. 10, which are implemented in software as buttons/keys can be removed in any FDCI-TCDU implementation, provided that the input fields themselves are active touch areas that become the functional equivalent of LSKs.

In addition, where tactile feedback is desirable for confirming that an action was accepted or completed and/or to reduce the need for visual acquisition of controls and associated information, the FDCIs 18 may be configured to provide pilots with differential haptic sensations to the finger(s). Implementations of such configurations may be via means such as a vibrating screen surface that produces a variety of button-like effects or morphing materials that produce different haptic effects to different parts of the screen. For example, some embodiments may utilize commercially available haptic feedback kits for touch screens commercially available from companies such as Immersion Corporation®. Furthermore, software controlled haptic feedback may be integrated into the FDCIs 18 to provide context-dependent feedback including, for example, buttons which can impart different feedback based on context and function. In this regard, letters can be made to feel different from numerical keys or menu keys. Moreover, invalid key presses can be made to feel different from valid ones, thus giving the user instant confirmatory feedback. Such haptic feedback can be provided on any of the cockpit FDCIs 18*a*.

For example and without limitation, the forward instrument panel 54, control pedestal 58, and tray 114 FDCIs 18 of the FDCI-based cockpit may be configured for multi-touch mapping and charting capabilities utilizing multi-touch capability, for example and without limitation, such as that commercially available from Stantum®, 3M™, or others. The FDCIs 18 may be configured to allow a pilot to directly interact with a graphical cartographic display using a touch screen and a "gesture vocabulary" of commands to, for example and without limitation, directly manipulate the map; scroll across a map; zoom in and out; select various map features to be on or off; declutter the display; activate "smart" menus based on touch proximity; obtain additional information from points on a map ("pick info"); and navigate across multiple map views (MAP to PLAN mode), all through direct interaction with the touch screen. Accordingly, the FDCI 18 can be configured in an embodiment that does not require a separate cursor control device or additional hardware.

In this regard, FDCI 18 may also be used as a precise pointing device such as a trackpad. In one distinct embodiment, one FDCI 18, such as a cockpit FDCI 18*a* at the tray 114 location or the control pedestal 58 could be partitioned to have a trackpad implemented as a system-level FDCI 18*b* to control a cursor on another cockpit FDCI 18*a* on the forward instrument panel 54 hosting a system-level FDCI 18*b* such as a navigation display. The trackpad system-level FDCI 18*b* could be one of the stored FDCI functional configurations that may be initiated or pop-up upon request by one of the pilots. This is yet another example of the inherent flexibility and adaptability of cockpit reconfiguration.

Figure 12:
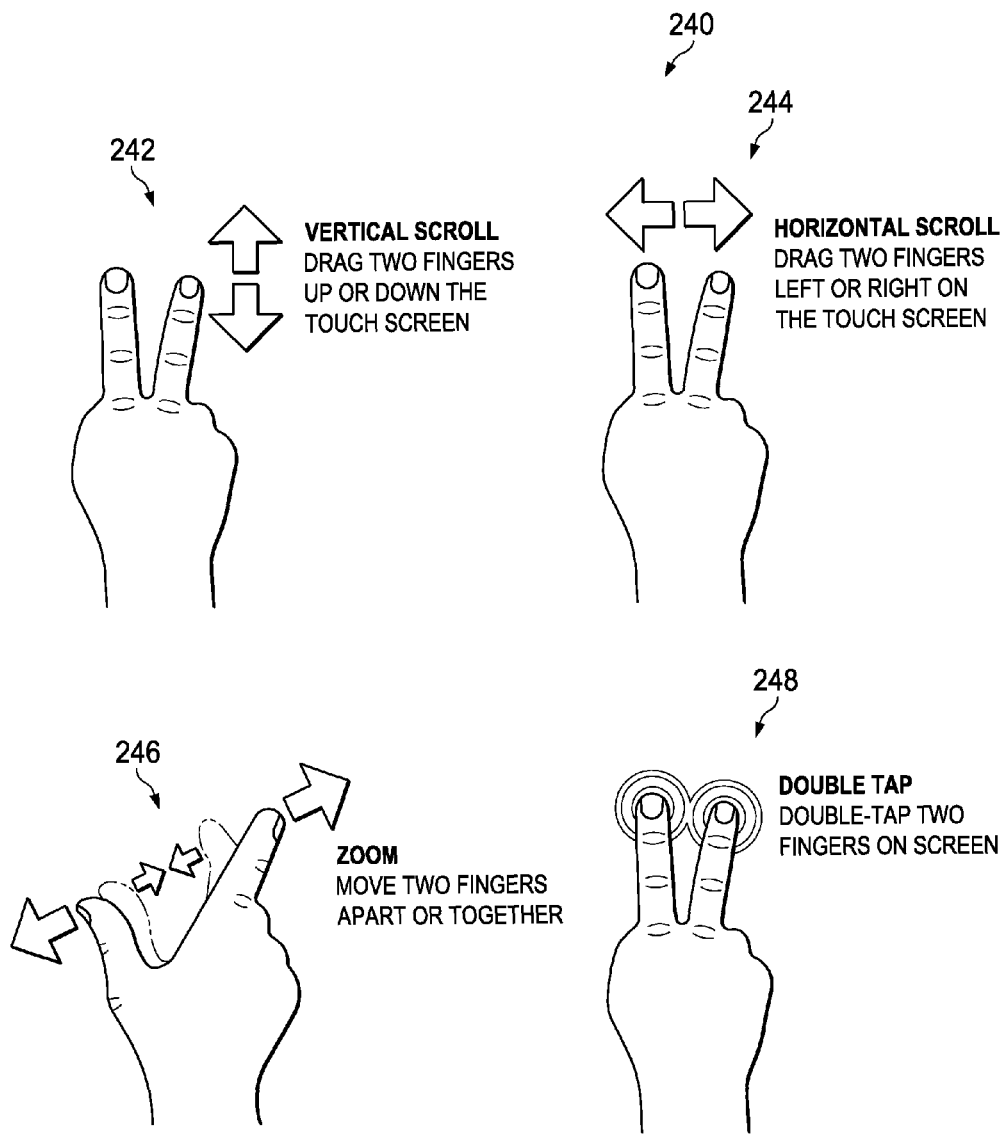
FIG. 12 is a diagram of examples of gestures that may be used to interact with FDCI-based maps and charts.

Furthermore, the FDCIs 18 may also be configured to link to a flight management computer to allow for graphical flight planning capability where pilots can build and modify a route. In addition to not requiring an additional control device (other than the touch screen itself), these interactions eliminate the need to place the cursor in a particular "mode" to accomplish different tasks (e.g. dragging vs. selecting). Examples of "mode-less" interactions, which assign specific control actions to a set of unique gestures 240 are shown in FIG. 12 for vertical scroll 242, horizontal scroll 244, zoom 246, and double tap 248 used to hide/show buttons and menus. Further "mode-less" interactions may be enabled by gestures such as those disclosed in the gesture vocabulary of Table 1 below for charting functions.

TABLE 1

Multi-Touch Charting Gestures

| Function | Gesture |
|---|---|
| Hide/Show Buttons and Menus | Double-tap anywhere A double tap in the close proximity to a menu's regular button location will show the buttons and menus with at particular menu that's already open |
| Select Menu Items | Single-tap on item |
| Center on Destination | Touch "destination bubble" icon at edge of screen; Note: bubble will only show if the aircraft is not in view |
| Show Keyboard | 6+ fingers down |
| Hide Keyboard | Tap "Close" button on keyboard |
| MAP or VSD Panning | 2-finger drag (any direction on the map; for VSD - drag in horizontal direction only |
| Pick Info | 1-finger drag moves cursor, highlighting items under finger, showing a magnified view while dragging. If the user pauses over any particular item for greater than 1 second, a button will appear next to the cursor finger. Tapping this button activates the full pick-info details page |
| Range Change | 2-finger expand (range in)/2-finger pinch (range out) |
| MAP/PLAN Mode Change | 4-finger swipe left = PLAN to MAP; 4-finger swipe right = MAP to PLAN |
| Display Transfer | 5-finger drag to transparent flight deck diagram |
| Tray Homescreen | 5-finger crumple |
| VSD Vertical Scale Change | 2-finger pinch/expand in the VSD vertical scale area |
| Show/Hide VSD | 3-finger drag up =Show VSD; 3-finger drag down = Hide VSD |

Figure 13:
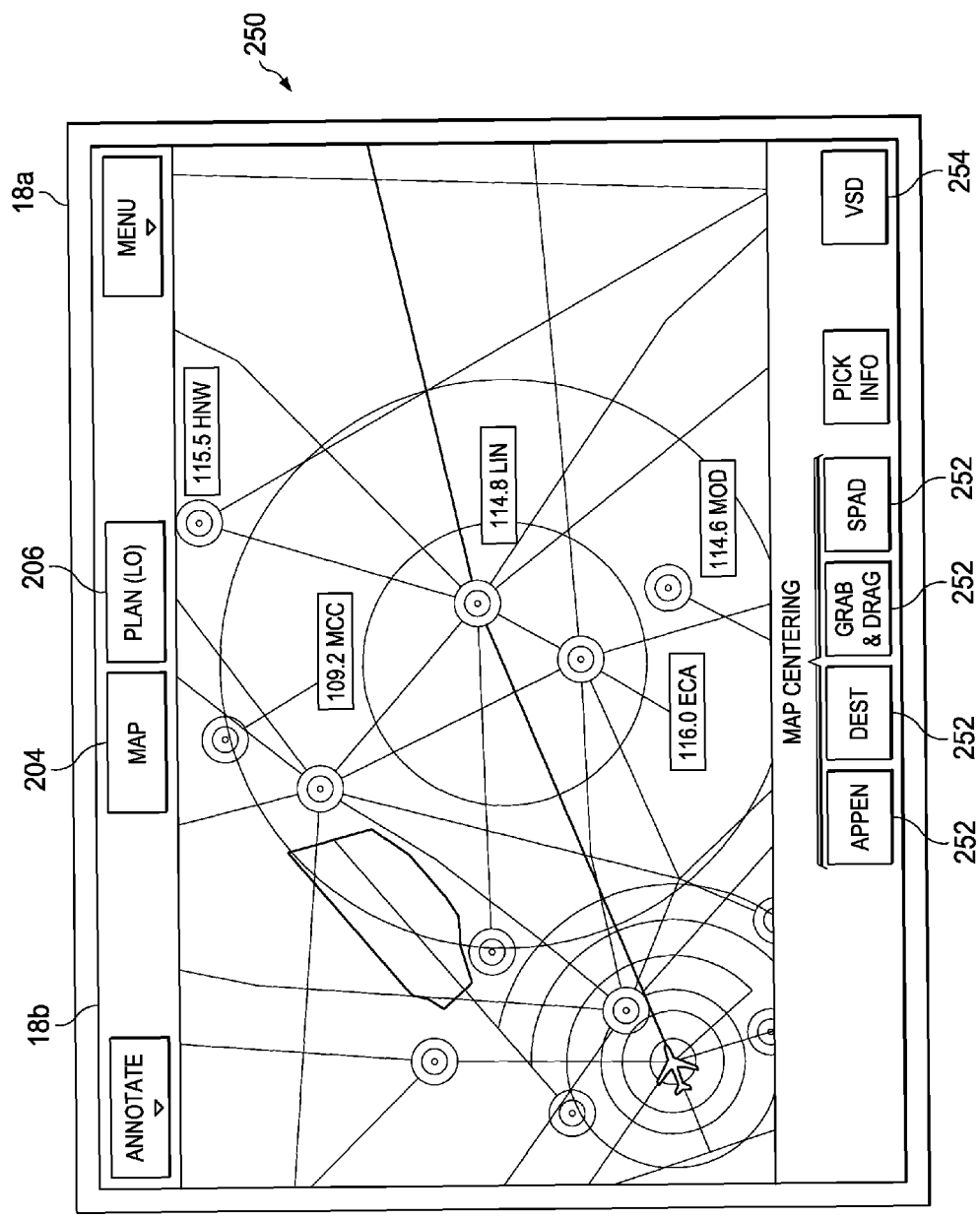
FIGS. 13-14 are illustrations depicting how a typical standard view can be decluttered when a gesture-based interaction capability is employed.
Figure 14:
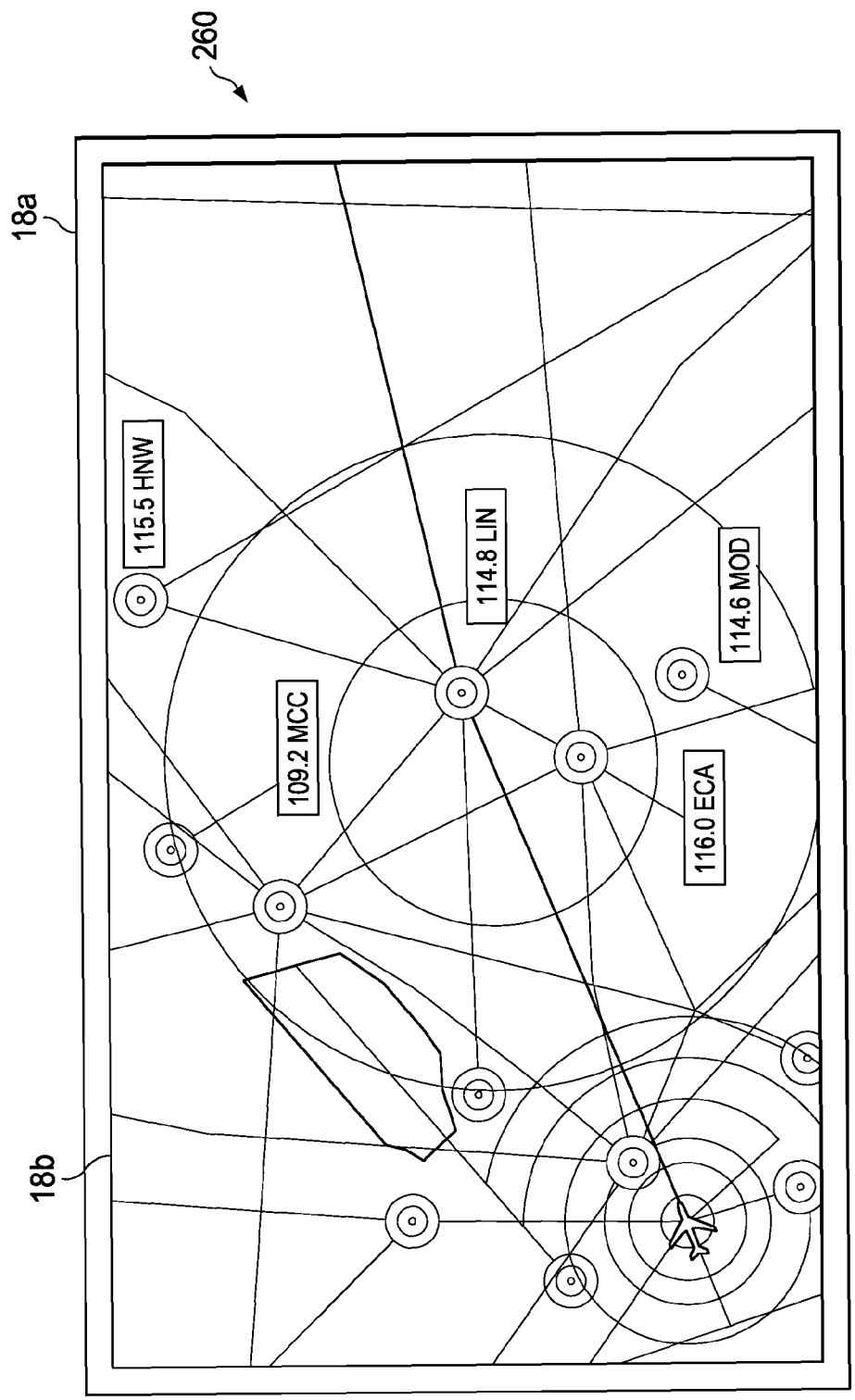

Turning now to an application of gestures, consider the double tap gesture 248 of FIG. 12 and the double tap gesture function of row 1 of Table 1 above. FIG. 13 depicts an embodiment 250 of a cockpit FDCI 18*a* with a system-FDCI 18*b* for a navigation map depicting a chart. The navigation map has a number of menu buttons for accepting flight crew interaction such as map mode 204 and plan mode 206 and map centering buttons 252, as well as other buttons such as VSD 254 whose description is not required for the purposes of the following example. If the flight crew desires to declutter the map so as to remove the menu buttons along the top and bottom of the display, a double tap gesture 248 anywhere on the map removes the menu buttons such that the system-FDCI 18*b* for the map is depicted in decluttered mode 260 without menu buttons as shown in FIG. 14.

Thus, in this instance, the double tap gesture 248 freed up additional display space allowing the user to further interact with the information via "mode-less" gesture input, rather than with on-screen buttons. When operating in decluttered mode 260 as shown in FIG. 14, functions provided by the buttons such as map mode 204, plan mode 206, and map centering buttons 252 of FIG. 13 can be accomplished using gestures of the gesture vocabulary of Table 1. Additional gestures can be used to modify the displayed information, such as making a vertical profile view appear or disappear, increasing or decreasing the display range, or panning across the map. Accordingly, one can build upon the gesture vocabulary of Table 1 as new functionality is introduced in system-level FDCIs 18b.

Lastly, an example of a gesture recognition method flowchart illustrative of how gestures are processed in an FDCI-based cockpit is shown in FIGS. 15A-15D. It should be noted here that a sequence of gestures are one novel method for providing the functional equivalent of hardware "guarded switches", used to ensure that critical or irreversible actions are not inadvertently selected. A multi-step gesture can be reliably interpreted by the system as a deliberate act by the pilot. As an example, the EXECUTE command that loads a route modification can be implemented as a triple tap, a series of drag actions, or even a tracing of a symbol such as an "E" or a checkmark. Guarded switches support various function in the flight deck, and are not limited to chart (FIG. 13) or TCDU (FIGS. 10-11) implementations.

Turning now to FIG. 15A, the method 300 starts with a check of sensor status 302a, status of last gesture and active sensors 302b-302h where the number of active sensors corresponds to the number of touch input. For example, 302e corresponds with a single finger (active sensor=1 and click number>1) resulting in the gesture being processed as a single finger double tap 304d gesture. In another example, utilizing both FIG. 15A and Table 1, a sensed touch input of six or more active sensors 302h results in the gesture being processed as a six or more fingers down gesture 304g, which based on the gesture dictionary of Table 1, corresponds with an input to show the keyboard 208 system-level FDCI 18a.

To avoid prolixity, a detailed discussion of each element of the flowchart will not be made. However, it is helpful to provide a pertinent overview of FIGS. 15B-15D whose operation is substantially similar to that of FIG. 15A described above. Note also that when transitioning from FIG. 15A to 15B, the left hand portion of 15A flows to the left hand portion of 15B and the right hand portion of 15A flows to the right hand portion of 15B. Other parts of the flowchart (15C-15D) for the method 300 work in similar fashion.

Figure 15B:
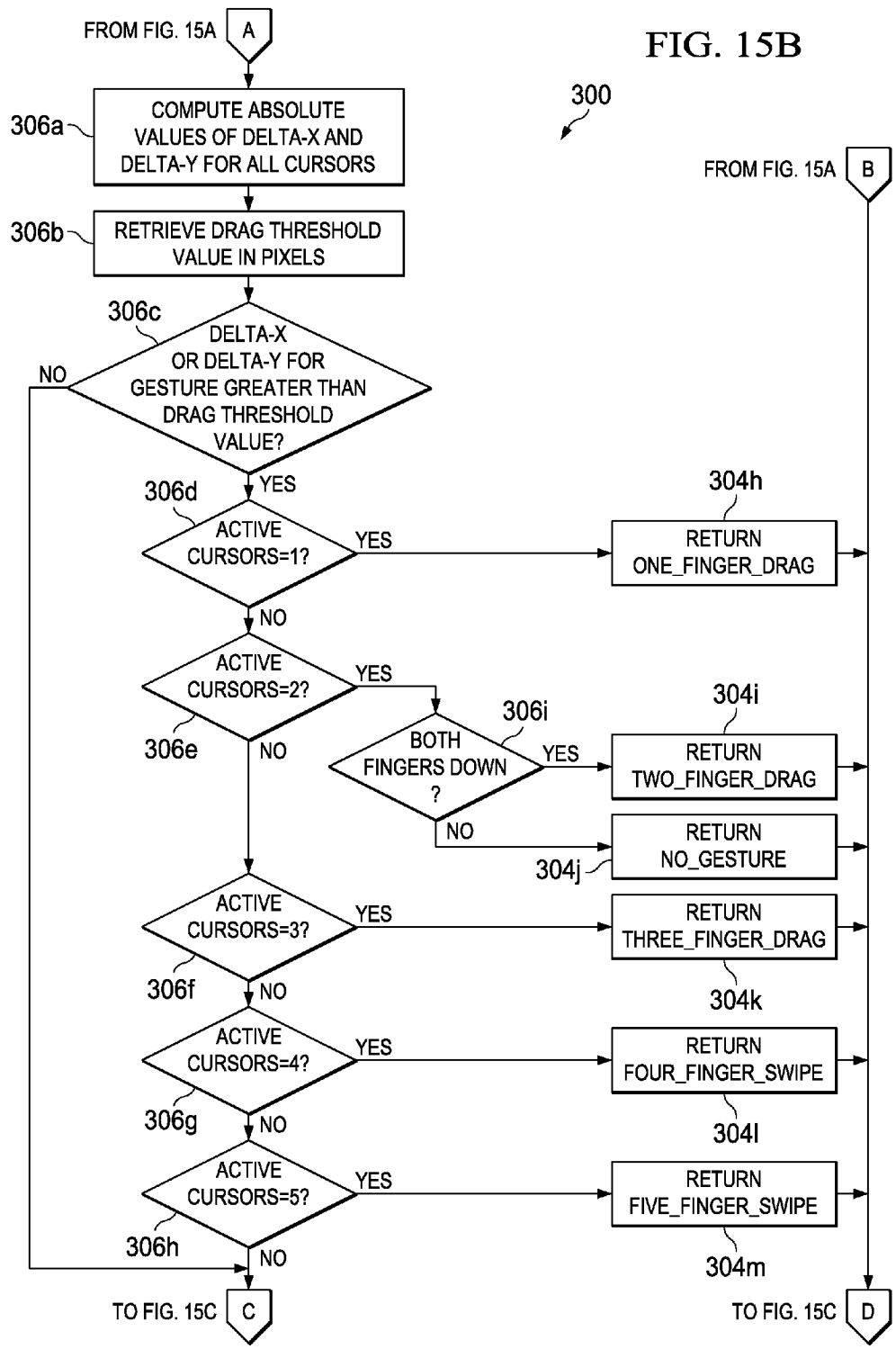
Figure 15C:
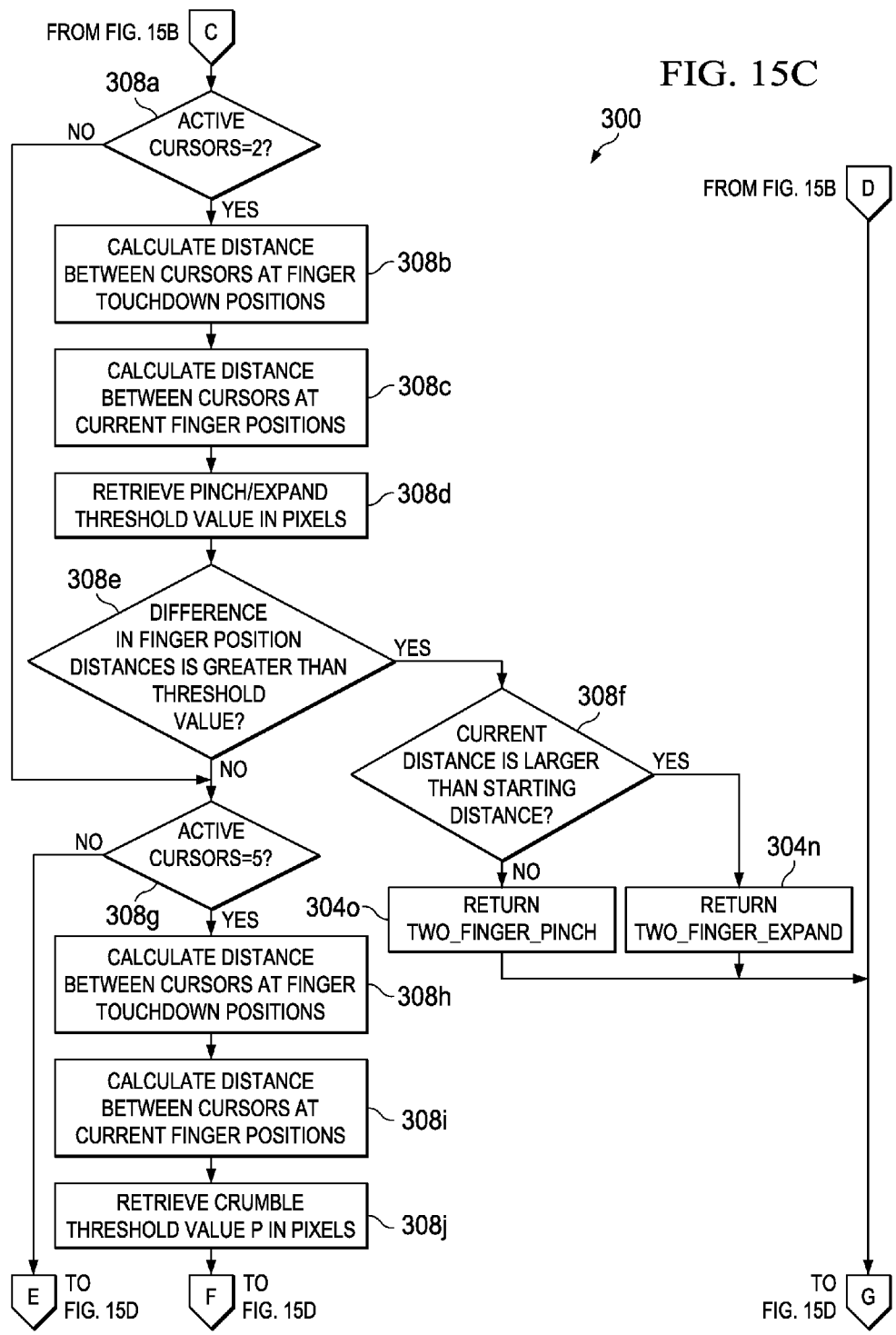
Figure 15D:
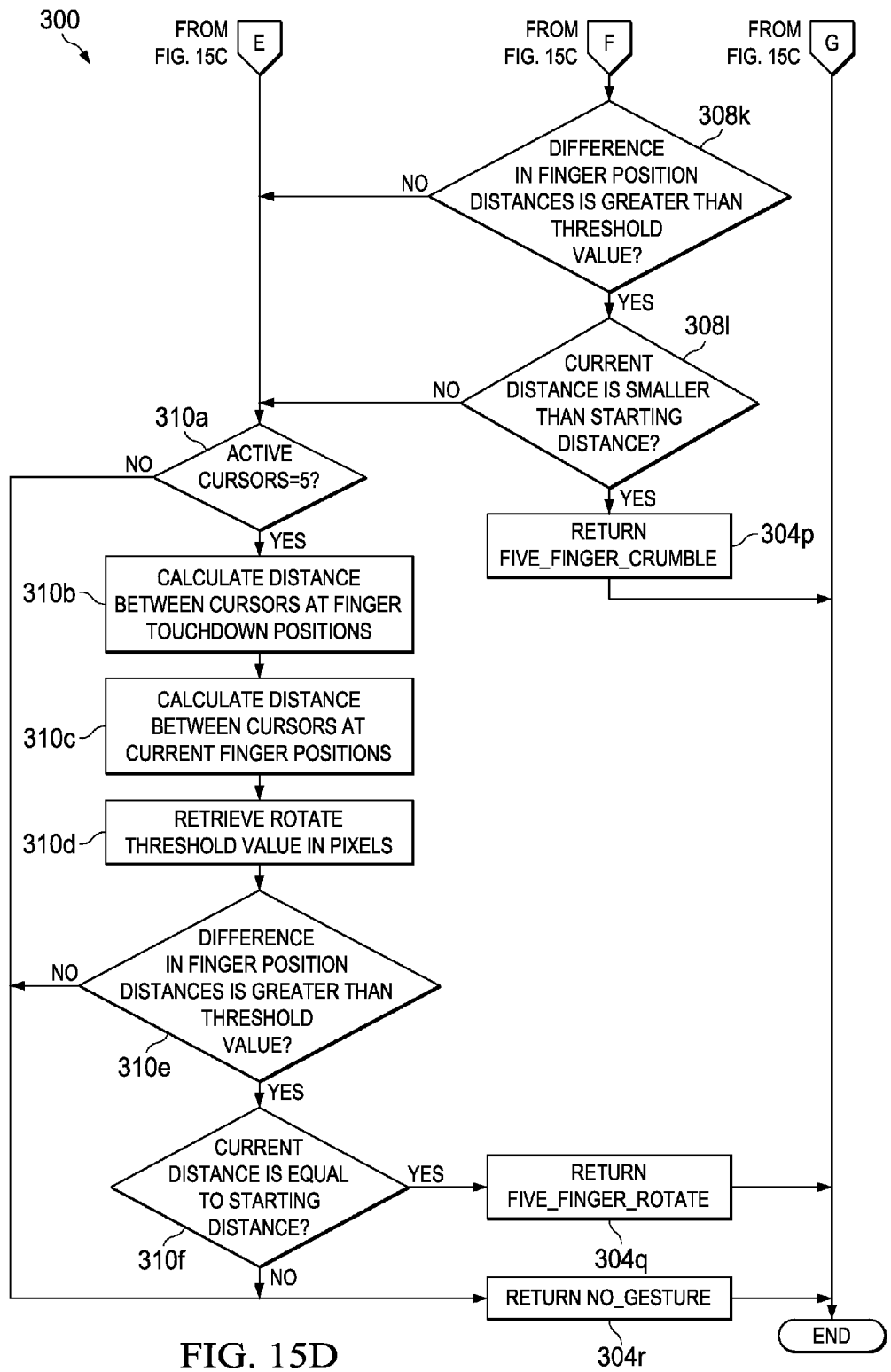

Turning now to FIG. 15B, depicted is the portion of the method 300 that processes drag gestures. Method steps 306a-306h process sensor inputs or perform computations as shown and return gestures 304h-304m corresponding to the sensor inputs based on the processing. Following the method steps to FIG. 15C, method steps 308a-308f depict method 300 steps for processing pinch and expand gestures 304n-304o. In a similar manner, steps 308g-308k of FIGS. 15C and 15D depict method 300 portions for crumple gesture 304p. Lastly, steps 310a-310f of FIG. 15D show method 300 portions for rotation gesture 304q, with 304r depicting the processing of no gesture if the previous processing steps result in the detection of no gestures.

Those of ordinary skill in the art will appreciate that FDCIs 18 can be implemented for almost all existing cockpit controls. It should be appreciated that the logical operations described herein are implemented as a sequence of computer implemented acts or program modules running on a computing system such as an FDCI system 12 or computer and/or as interconnected machine logic circuits or circuit modules within the computing system. The implementation is a matter of choice dependent on the performance and other requirements of the computing system. Accordingly, the logical operations described herein are referred to variously as steps, operations, or acts. These steps, operations, or acts may be implemented in software, in firmware, in special purpose digital logic, and any combination thereof. It should also be appreciated that more or fewer operations may be performed than shown in the figures and described herein. These operations may also be performed in a different order than those described herein.

Figure 16:
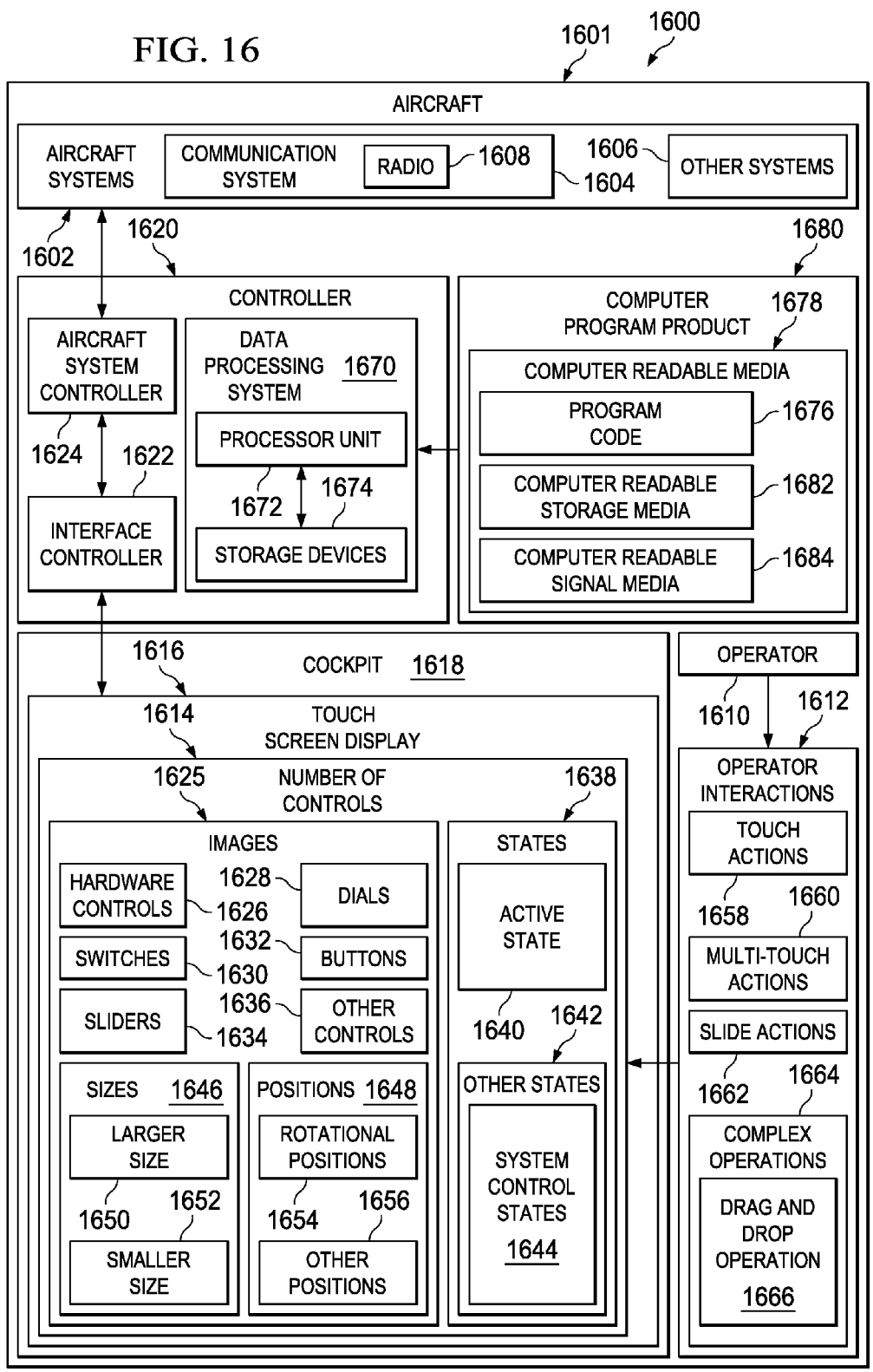
FIG. 16 is an illustration of a block diagram of a multi-touch cockpit interface for controlling aircraft systems in accordance with an illustrative embodiment.

Turning now to FIG. 16, an illustration of a block diagram of a multi-touch cockpit interface for controlling aircraft systems is depicted in accordance with an illustrative embodiment. For example, without limitation, multi-touch cockpit interface 1600 may be implemented in FDCI system 12 in FIG. 1.

In this example, aircraft 1601 may be a commercial passenger aircraft, a cargo aircraft, or any other type of aircraft. For example, without limitation, aircraft 1601 may be an example of one implementation of aircraft 42 in FIG. 2.

Aircraft 1601 may include aircraft systems 1602. For example, without limitation, aircraft systems 1602 may include communication system 1604 and other systems 1606. In this example, communication system 1604 may be an example of one implementation of communication system 24 in FIG. 1. Flight management system 14, aircraft control system 20, navigation system 22, and surveillance system 26 in FIG. 1 may be examples of other systems 1606.

Communication system 1604 may include radio 1608. Radio 1608 may include any number of radios configured for providing voice communication, data communication, or both, for aircraft 1601. For example, without limitation, radio 1608 may be configured to provide communication between aircraft 1601 and other radios located on the ground, in other aircraft, in other vehicles, or in any other location or combination of locations. Radio 1608 may be configured to provide radio communication at any appropriate number of radio frequencies and using any appropriate radio technology.

In accordance with an illustrative embodiment, operator 1610 may control operation of aircraft systems 1602 by operator interactions 1612 with number of controls 1614 on touch screen display 1616. In this example, operator 1610 may be a member of the flight crew for aircraft 1601. For example, without limitation, operator 1610 may be a pilot, co-pilot, or other member of the flight crew for aircraft 1601. In accordance with an illustrative embodiment, multi-touch technology may be used to allow for operator interactions 1612 from more than one of operator 1610 at the same time.

Touch screen display 1616 may be implemented using any appropriate touch screen display device. For example, without limitation, touch screen display 1616 may be implemented using a multi-touch display device. Touch screen display 1616 may be located in cockpit 1618 of aircraft 1601. Thus, touch screen display 1616 may be implemented on or using any appropriate display device located in cockpit 1618 that may be configured to provide number of controls 1614. For example, a 12 inch by 9 inch multi-touch display with a resolution of 1400 by 1050, or another touch screen display device appropriate for use in cockpit 1618 of aircraft 1601, may be used to implement touch screen display 1616.

Either a single touch screen display device or multiple touch screen display devices may be used to implement touch screen display 1616.

In one example, without limitation, touch screen display 1616 may be an example of one implementation of cockpit FDCI 18*a* in FIG. 1. In this case, touch screen display 1616, including number of controls 1614, may be provided at any appropriate location of cockpit FDCI 18*a* in cockpit workspace 110 in FIGS. 6A and 6B.

Controller 1620 may be configured to display number of controls 1614 on touch screen display 1616, to receive indications of operator interactions 1612 with number of controls 1614, and to control operation of aircraft systems 1602 in response to the indications of operator interactions 1612 received by controller 1620. For example, controller 1620 may include interface controller 1622 and aircraft system controller 1624.

Interface controller 1622 may be configured to control the display of number of controls 1614 on touch screen display 1616. For example, number of controls 1614 may comprise images 1625 displayed on touch screen display 1616 to represent number of controls 1614. In this example, number of controls 1614 may be referred to as software controls.

In one example, images 1625 may represent hardware controls 1626 for controlling aircraft systems 1602. For example, hardware controls 1626 may be conventional hardware controls for controlling operation of aircraft systems 1602. In this case, images 1625 representing hardware controls 1626 may be used and arranged on touch screen display 1616 to provide a mapping of the conventional hardware controls for aircraft systems 1602 into the software controls provided by number of controls 1614. In other words, an existing design and layout of hardware controls 1626 for aircraft systems 1602 may be replicated by images 1625 for number of controls 1614 on touch screen display 1616. By providing a familiar interface, an interface in accordance with an illustrative embodiment may be used more easily and adopted faster by operator 1610 who is familiar with the conventional hardware controls for aircraft systems 1602.

For example, without limitation, number of controls 1614 may include images 1625 of dials 1628, switches 1630, buttons 1632, sliders 1634, other controls 1636, or various combinations of controls. Number of controls 1614 may be implemented in manner such that operator interactions 1612 with images 1625 of number of controls 1614 is intuitive. In other words, number of controls 1614 may be implemented in a manner such that operator interactions 1612 with images 1625 of number of controls 1614 both affect operation of aircraft systems 1602 being controlled in an expected manner and changes images 1625 of number of controls 1614 to reflect operator interactions 1612 in an expected manner.

For example, without limitation, images 1625 of dials 1628 may include images 1625 representing continuous position dials, images 1625 representing discreet position dials, or both. In this case, images 1625 of dials 1628 may change in response to operator interactions 1612 in a manner that corresponds to changes in hardware, continuous, and discreet position dials in response to operator interactions 1612 with such hardware dials. As another example, without limitation, images 1625 of switches 1630 may include images 1625 representing momentary switches. In this case, images 1625 of switches 1630 may change in response to operator interactions 1612 in a manner that corresponds to changes in hardware momentary switches in response to operator interactions 1612 with such hardware switches.

Number of controls 1614 may be defined by states 1638. In accordance with an illustrative embodiment, aircraft systems 1602 may be operated in a manner as indicated by states 1638 of number of controls 1614 for controlling aircraft systems 1602. States 1638 of number of controls 1614 may be indicated by images 1625 of number of controls 1614. Operator 1610 controls operation of aircraft systems 1602 by operator interactions 1612 with images 1625 of number of controls 1614. In accordance with an illustrative embodiment, operator interactions 1612 with images 1625 may both change states 1638 of number of controls 1614, to thereby change operation of aircraft systems 1602, and may result in corresponding changes in images 1625, to reflect the change in states 1638 of number of controls 1614.

For example, states 1638 of number of controls 1614 may include active state 1640 and other states 1642. Other states 1642 may include, for example, system control states 1644. Active state 1640 may be a state of number of controls 1614 in which other states 1642 may be changed by operator interactions 1612 with number of controls 1614. Number of controls 1614 may be inactive when number of controls 1614 is not in active state 1640. In this case, other states 1642 may not be changed by operator interactions 1612 with number of controls 1614. However, operator interactions 1612 with number of controls 1614 may change states 1638 of number of controls 1614 to active state 1640.

System control states 1644 are states 1638 of number of controls 1614 that are used to control aircraft systems 1602. In accordance with an illustrative embodiment, aircraft systems 1602 may be operated in a manner as indicated by system control states 1644 of number of controls 1614 for controlling aircraft systems 1602.

States 1638 of number of controls 1614 may be indicated by images 1625 of number of controls 1614 in any appropriate manner. For example, without limitation, states 1638 of number of controls 1614 may be indicated by sizes 1646, positions 1648, or other characteristics or combinations of characteristics of images 1625.

For example, without limitation, active state 1640 for number of controls 1614 may be indicated by larger size 1650 of images 1625 representing number of controls 1614 in active state 1640. Otherwise, number of controls 1614 that that are not in active state 1640 may be indicated by smaller size 1652 of such number of controls 1614.

As another example, without limitation, other states 1642 of number of controls 1614 may be indicated by positions 1648 of images 1625, or of portions of images 1625, representing number of controls 1614. For example, without limitation, states 1638 of number of controls 1614 represented by images 1625 of dials 1628 may be indicated by rotational positions 1654 of such images 1625 of dials 1628. States 1638 of number of controls 1614 represented by other images 1625 may be indicated by other positions 1656 of such images 1625 or portions of such images 1625. For example, without limitation, states 1638 of number of controls 1614 represented by images of switches 1630 may be indicated by alternatively displaying images 1625 of a switch in a first position and images 1625 of the switch in a second position.

Operator 1610 may change states 1638 of number of controls 1614 by operator interactions 1612 with images 1625 of number of controls 1614 on touch screen display 1616. Operator interactions 1612 may include, for example, without limitation, touch actions 1658, multi-touch actions 1660, slide actions 1662, complex operations 1664, or other operator interactions or combinations of operator interactions with touch screen display 1616.

In touch actions 1658, operator 1610 may touch images 1625 of number of controls 1614 at selected locations on touch screen display 1616 for a selected duration. Operator 1610 may perform touch actions 1658 using a finger, a stylus, a pen, or another tool or device. The duration of touch actions 1658 may be used to distinguish between a tap and a hold action. Multi-touch actions 1660 may include multiple touch actions 1658 that are performed at the same time by a single operator or by more than one operator. In slide actions 1662, operator 1610 may touch images 1625 of number of controls 1614 at selected locations on touch screen display 1616 and then move the touch along touch screen display 1616 for a selected distance.

Multiple touch actions 1658, slide actions 1662 or other operator interactions 1612 or combinations of interactions with touch screen display 1616 may be used to perform complex operations 1664. For example, without limitation, drag and drop operation 1666 is one example of complex operations 1664 that may be performed by operator interactions 1612 with touch screen display 1616.

Indications of operator interactions 1612 with number of controls 1614 may be provided from touch screen display 1616 to interface controller 1622. Interface controller 1622 may then change states 1638 of number of controls 1614 in response to the received indications of operator interactions 1612. Interface controller 1622 may also change images 1625 of number of controls 1614 displayed on touch screen display 1616 to indicate the changed states 1638 of number of controls 1614.

Aircraft system controller 1624 may control operation of aircraft systems 1602 in a manner indicated by states 1638 of number of controls 1614. For example, without limitation, aircraft system controller 1624 may generate control signals or take other appropriate actions in response to changes in states 1638 of number of controls 1614, as provided by interface controller 1622, so that aircraft systems 1602 are operated in a manner indicated by the current states 1638 of number of controls 1614.

The various functions performed by controller 1620 may be performed by one or more data processing devices that may be located at one or more locations in aircraft 1601. For example, one or more functions of controller 1620 may be performed by a data processing device located in cockpit 1618 of aircraft 1601. As another example, one or more functions of controller 1620 may be performed by data processing capabilities that are provided as part of touch screen display 1616, aircraft systems 1602, or both.

For example, without limitation, the functions performed by controller 1620 may be implemented in data processing system 1670. In this illustrative example, data processing system 1670 may include processor unit 1672 and storage devices 1674. Storage devices 1674 may include memory, persistent storage, or both.

Processor unit 1672 serves to run instructions for software that may be loaded into memory. Processor unit 1672 may be a number of processors, a multi-processor core, or some other type of processor, depending on the particular implementation. Further, processor unit 1672 may be implemented using a number of heterogeneous processor systems in which a main processor is present with secondary processors on a single chip. As another illustrative example, processor unit 1672 may be a symmetric multi-processor system containing multiple processors of the same type.

Storage devices 1674 may include any piece of hardware that is capable of storing information, such as, for example, without limitation, data, program code in functional form, and other suitable information either on a temporary basis or a permanent basis. Storage devices 1674 also may be referred to as computer readable storage devices in these examples. Storage devices 1674 may include, for example, a random access memory or any other suitable volatile or non-volatile storage device. Storage devices 1674 may take various forms, depending on the particular implementation.

For example, storage devices 1674 may contain one or more components or devices. For example, storage devices 1674 may include a hard drive, a flash memory, a rewritable optical disk, a rewritable magnetic tape, or some combination of the above. The media used by storage devices 1674 also may be removable. For example, a removable hard drive may be used for storage devices 1674.

Instructions for the operating system, applications, and/or programs may be located in storage devices 1674, which are in communication with processor unit 1672. In these illustrative examples, the instructions may be in a functional form on persistent storage. These instructions may be loaded into memory for execution by processor unit 1672. The processes of the different embodiments may be performed by processor unit 1672 using computer-implemented instructions, which may be located in storage devices 1674.

These instructions are referred to as program instructions, program code, computer usable program code, or computer readable program code that may be read and executed by a processor in processor unit 1672. The program code in the different embodiments may be embodied on different physical or computer readable storage media, such as storage devices 1674.

Program code 1676 is located in a functional form on computer readable media 1678 that is selectively removable and may be loaded onto or transferred to data processing system 1670 for execution by processor unit 1672. Program code 1676 and computer readable media 1678 form computer program product 1680 in these examples. In one example, computer readable media 1678 may be computer readable storage media 1682 or computer readable signal media 1684.

Computer readable storage media 1682 may include, for example, an optical or magnetic disk that is inserted or placed into a drive or other device that is part of storage devices 1674 for transfer onto a storage device, such as a hard drive, that is part of storage devices 1674. Computer readable storage media 1682 also may take the form of a persistent storage, such as a hard drive, a thumb drive, or a flash memory, that is connected to data processing system 1670. In some instances, computer readable storage media 1682 may not be removable from data processing system 1670.

In these examples, computer readable storage media 1682 is a physical or tangible storage device used to store program code 1676 rather than a medium that propagates or transmits program code 1676. Computer readable storage media 1682 is also referred to as a computer readable tangible storage device or a computer readable physical storage device. In other words, computer readable storage media 1682 is a media that can be touched by a person.

Alternatively, program code 1676 may be transferred to data processing system 1670 using computer readable signal media 1684. Computer readable signal media 1684 may be, for example, a propagated data signal containing program code 1676. For example, computer readable signal media 1684 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1676 may be downloaded over a network to storage devices 1674 from another device or data processing system through computer readable signal media 1684 for use within data processing system 1670. For instance, program code 1676 stored in a computer readable storage medium in a server data processing system may be downloaded over a network from the server to data processing system 1670. The data processing system providing program code 1676 may be a server computer, a client computer, or some other device capable of storing and transmitting program code 1676.

The different components illustrated for data processing system 1670 are not meant to provide architectural limitations to the manner in which different embodiments may be implemented. The different illustrative embodiments may be implemented in a data processing system including components in addition to and/or in place of those illustrated for data processing system 1670. The different embodiments may be implemented using any hardware device or system capable of running program code. As one example, data processing system 1670 may include organic components integrated with inorganic components and/or may be comprised entirely of organic components excluding a human being. For example, a storage device may be comprised of an organic semiconductor.

In another illustrative example, processor unit 1672 may take the form of a hardware unit that has circuits that are manufactured or configured for a particular use. This type of hardware may perform operations without needing program code to be loaded into a memory from a storage device to be configured to perform the operations.

For example, when processor unit 1672 takes the form of a hardware unit, processor unit 1672 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1676 may be omitted, because the processes for the different embodiments are implemented in a hardware unit.

In still another illustrative example, processor unit 1672 may be implemented using a combination of processors found in computers and hardware units. Processor unit 1672 may have a number of hardware units and a number of processors that are configured to run program code 1676. With this depicted example, some of the processes may be implemented in the number of hardware units, while other processes may be implemented in the number of processors.

The illustration of FIG. 16 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, touch screen display 1616 may be used to display information to operator 1610 in addition to number of controls 1614. Such information may include, for example, without limitation, information indicating current operating characteristics or conditions of aircraft systems 1602, instructions for operating number of controls 1614, or other information or various combinations of information.

Illustrative embodiments may be used to provide interfaces for controlling aircraft systems 1602 other than communication system 1604 and radio 1608. Illustrative embodiments also may be used to provide interfaces for controlling systems other than aircraft systems 1602. For example, without limitation, illustrative embodiments may be used to provide interfaces for controlling radios that are not used on aircraft.

Figure 17:
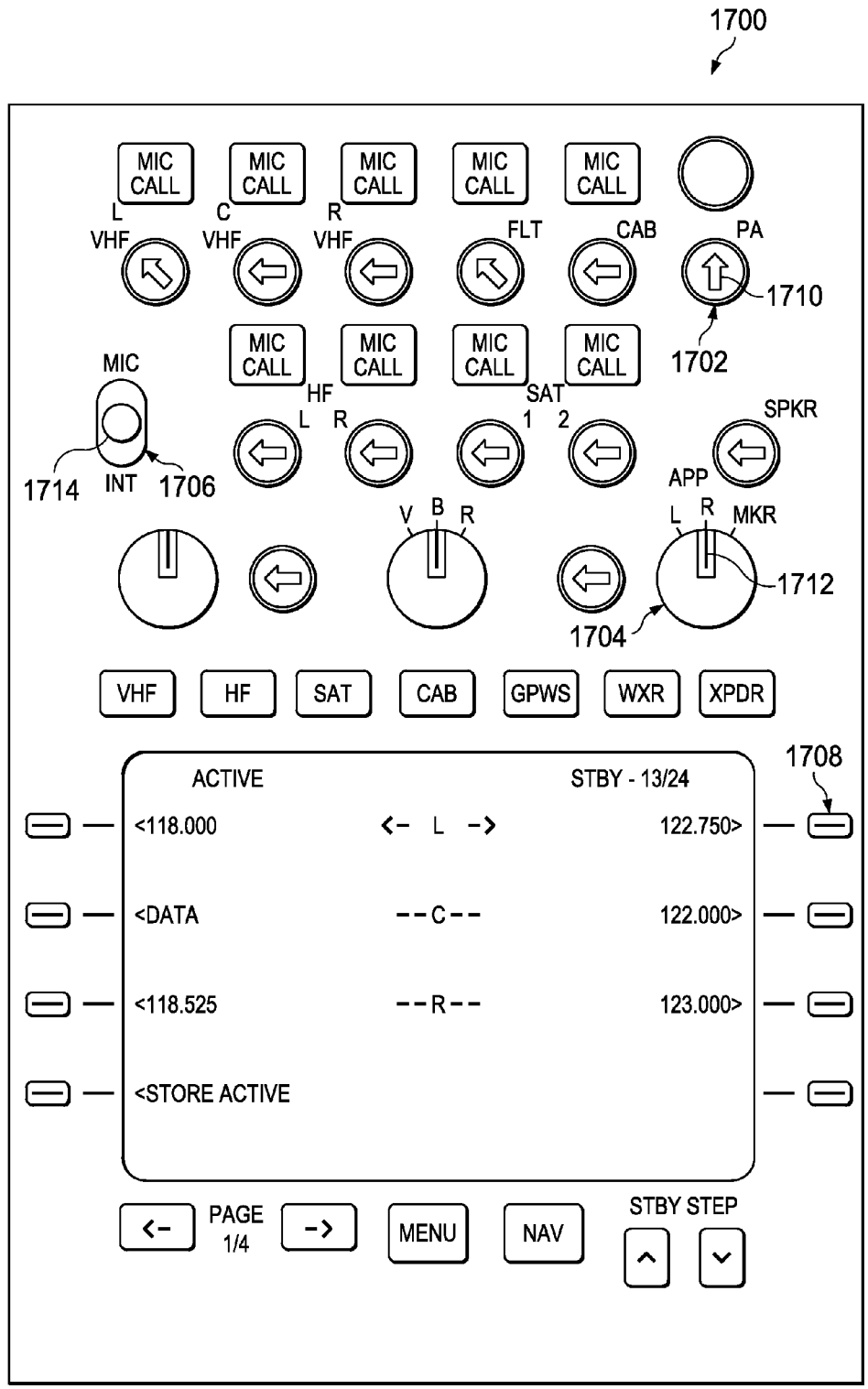
FIG. 17 is an illustration of an interface for controlling a radio in accordance with an illustrative embodiment.

Turning now to FIG. 17, an illustration of an interface for controlling a radio is depicted in accordance with an illustrative embodiment. In this example, interface 1700 is an example of one implementation of an interface including a number of controls that may be displayed on touch screen display 1616 for controlling radio 1608 in FIG. 16.

In this example, interface 1700 includes a number of controls that comprise images representing hardware controls for controlling a radio. The images of the controls are arranged in a layout that corresponds to a conventional layout of hardware controls for the radio. Thus, interface 1700 may be easy to use and readily adopted by an operator that is familiar with the conventional hardware controls for the radio.

Interface 1700 includes a number of controls comprising images representing continuous position dials 1702, discrete position dials 1704, a momentary switch 1706, and buttons 1708. In this example, the rotational position of continuous position dials 1702 is indicated by an arrow, such as arrow 1710. The rotational position of discrete position dials 1704 is indicated by a line, such as line 1712. In this example, the rotational position of the images of dials 1702 and 1704 may indicate the state of the controls represented by the images of dials 1702 and 1704. In this example, the position of an image of switch 1714 in momentary switch 1706 may indicate the state of the control represented by the image of momentary switch 1706.

Figure 18:
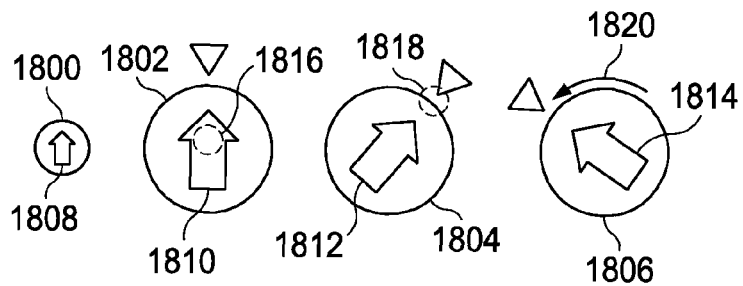
FIG. 18 is an illustration of dial controls in accordance with an illustrative embodiment.

Turning now to FIG. 18, an illustration of dial controls is depicted in accordance with an illustrative embodiment. In this example, dials 1800, 1802, 1804, and 1806 are examples of implementations of dials 1628 displayed on touch screen display 1616 in FIG. 16. In this example, dials 1800, 1802, 1804, and 1806 may be continuous position dials. Therefore, dials 1800, 1802, 1804, and 1806 may be moved to any rotational position within a selected range of rotational positions. In this example, the rotational positions of dials 1800, 1802, 1804, and 1806 are indicated by arrows 1808, 1810, 1812, and 1814, respectively.

In this example, the image of dial 1800 is smaller than the images of dials 1802, 1804, and 1806. The smaller size of the image of dial 1800 indicates that the control represented by dial 1800 is not in an active state. The control represented by dial 1800 may be changed to the active state by operator interactions with the image of dial 1800 before operator interactions with the image of dial 1800 may be used to change other states of the control represented by dial 1800. The smaller size for dial 1800 that is not in use may reduce undesired clutter on the interface including dial 1800.

In this example, the control represented by dial 1802 has been changed to the active state by an operator interaction including touching the image of dial 1802 for a selected duration. For example, an operator may change the control represented by dial 1802 to the active state by touching location 1816 on dial 1802 for a selected duration. The larger size of the image of dial 1802 indicates that the control represented by dial 1802 is in the active state. Further operator interactions with the image of dial 1802 may be used to change other states of the control represented by dial 1802. The larger size of dial 1802 that is in the active state may make it easier for an operator to interact with the image of dial 1802 to change the state of the control represented by the image of dial 1802.

An operator may change the state of the control represented by dial 1804 by touching dial 1804 at or near the edge of the image of dial 1804 for a selected duration. In this example, an operator has touched location 1818 on the edge of the image of dial 1804 and held the touch for a selected duration to change the state of the control represented by dial 1804. In response, the image of dial 1804 has been changed to indicate a change in the rotational position of dial 1804 to a new rotational position indicated by touch location 1818. In this example, the new rotational position of dial 1804 is indicated by arrow 1812 on the image of dial 1804 pointing in the direction of touch location 1818.

An operator may change the state of the control represented by dial 1806 by touching dial 1806 at or near the edge of the image of dial 1806 and by sliding the touch in a direction along the edge of the image of dial 1806 by a selected distance to indicate a desired change in the rotational position of dial 1806. In this example, an operator has moved a touch along the edge of the image of dial 1806 in the direction indicated by arrow 1820. In response, the image of dial 1806 is changed to indicate a change in the rotational position of dial 1806 to a new rotational position indicated by the distance that the touch is moved along the edge of the image of dial 1806 in the direction indicated by arrow 1820. The image of dial 1806 may be changed in real-time, or near real-time, to indicate the change in the rotational position of dial 1806 as the touch is moved along the edge of the image of dial 1806. In this example, the new rotational position of dial 1806 is indicated by arrow 1814 on the image of dial 1806 pointing in the direction of where the touch stops moving along the edge of the image of dial 1806.

Figure 19:
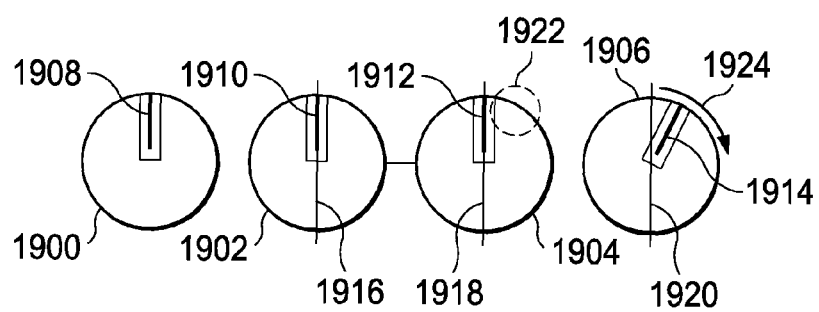
FIG. 19 is an illustration of other dial controls in accordance with an illustrative embodiment.

Turning now to FIG. 19, an illustration of other dial controls is depicted in accordance with an illustrative embodiment. In this example, dials 1900, 1902, 1904, and 1906 are examples of implementations of images 1625 of dials 1628 displayed on touch screen display 1616 in FIG. 16. In this example, dials 1900, 1902, 1904, and 1906 may be discrete position dials. Therefore, dials 1900, 1902, 1904, and 1906 may be moved between a discrete number of two or more rotational positions. In this example, the rotational positions of dials 1900, 1902, 1904, and 1906 are indicated by lines 1908, 1910, 1912, and 1914, on dials 1900, 1902, 1904, and 1906, respectively.

In this example, dial 1902 is bisected by line 1916 that extends through the middle of dial 1902. Dial 1904 is bisected by line 1918 that extends through the middle of dial 1904. Dial 1906 is bisected by line 1920 that extends through the middle of dial 1906. Lines 1916, 1918, and 1920 may be notional lines that divide dials 1902, 1904, and 1906, respectively, into left and right halves. Lines 1916, 1918, and 1920 may not be displayed to an operator.

An operator may change the state of the controls represented by dials 1902, 1904, and 1906, by touching the image of dial 1902, 1904, or 1906, to the left or right of line 1916, 1918, or 1920, respectively. Touching the image of dial 1902, 1904, or 1906, to the left of line 1916, 1918, or 1920, changes the rotational position of dial 1902, 1904, or 1906 counter-clockwise by one step, to the next discrete rotational position in the counter-clockwise direction. Touching the image of dial 1902, 1904, or 1906, to the right of line 1916, 1918, or 1920, changes the rotational position of dial 1902, 1904, or 1906 clockwise by one step, to the next discrete rotational position in the clockwise direction.

In this example, an operator may change the rotational position of dial 1904 clockwise by one step, to the next discrete rotational position in the clockwise direction, by touching the image of dial 1904 at location 1922 to the right of line 1918. In this example, an operator has touched the image of dial 1906 to the right of line 1920. In response, the image of dial 1906 is changed to show that the rotational position of dial 1906 is changed by one step to the next discrete rotational position in the clockwise direction indicated by arrow 1924.

Figure 20:
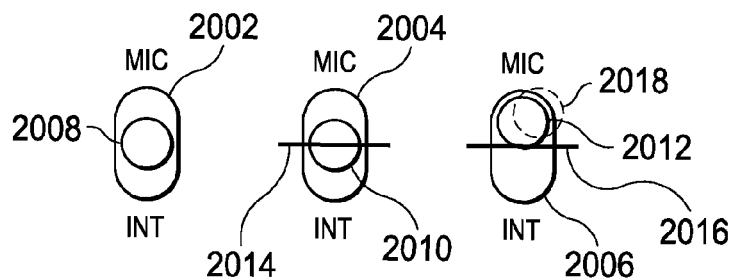
FIG. 20 is an illustration of switch controls in accordance with an illustrative embodiment.

Turning now to FIG. 20, an illustration of switch controls is depicted in accordance with an illustrative embodiment. In this example, switch controls 2002, 2004, and 2006 are examples of implementations of images 1625 of switches 1630 displayed on touch screen display 1616 in FIG. 16. In this example, switch controls 2002, 2004, and 2006 may be momentary switches. The state of the controls represented by switch controls 2002, 2004, and 2006 may be indicated by the positions of images of switches 2008, 2010, and 2012 within switch controls 2002, 2004, and 2006, respectively.

In this example, switch control 2004 is bisected by horizontal line 2014. Switch control 2006 is bisected by horizontal line 2016. Horizontal lines 2014 and 2016 may be notional lines that divide switch controls 2004 and 2006, respectively, into upper and lower parts. Horizontal lines 2014 and 2016 may not be displayed to an operator. As long as an operator is not touching the images of switch controls 2004 and 2006, the positions of images of switches 2010 and 2012 within switch controls 2004 and 2006, respectively, may be displayed in a first position where images of switches 2010 and 2012 are bisected by lines 2014 and 2016, respectively.

An operator may change the state of the controls represented by switch controls 2004 and 2006 by touching the image of switch control 2004 or 2006 either above or below line 2014 or 2016, respectively. Touching the image of switch control 2004 or 2006 above line 2014 or 2016 changes the image of switch 2010 or 2012, respectively, to an image of switch 2010 or 2012 in a second position where the image of switch 2010 or 2012 is above line 2014 or 2016 for as long as the operator continues touching the image of switch control 2004 or 2006. Touching the image of switch control 2004 or 2006 below line 2014 or 2016 changes the image of switch 2010 or 2012, respectively, to an image of switch 2010 or 2012 in a second position where the image of switch 2010 or 2012 is below line 2014 or 2016 for as long as the operator continues touching the image of switch control 2004 or 2006. In either case, the image of switch 2010 or 2012 returns automatically to the image of switch 2010 or 2012 in the first position, where the image of switch 2010 or 2012 is bisected by lines 2014 and 2016, respectively, when the operator stops touching the image of switch control 2004 or 2006.

In this example, an operator has touched the image of switch control 2006 at location 2018 above line 2016. In response, the image of switch 2012 in switch control 2006 is changed to an image of switch 2012 in a second position, where the image of switch 2012 is above line 2016. The image of switch 2012 will remain in this second position as long as the operator continues touching the image of switch control 2006 above line 2016. The image of switch 2012 will change automatically to an image of switch 2012 in a first position, where the image of switch 2012 is bisected by line 2016, when the operator stops touching the image of switch control 2006.

Figure 21:
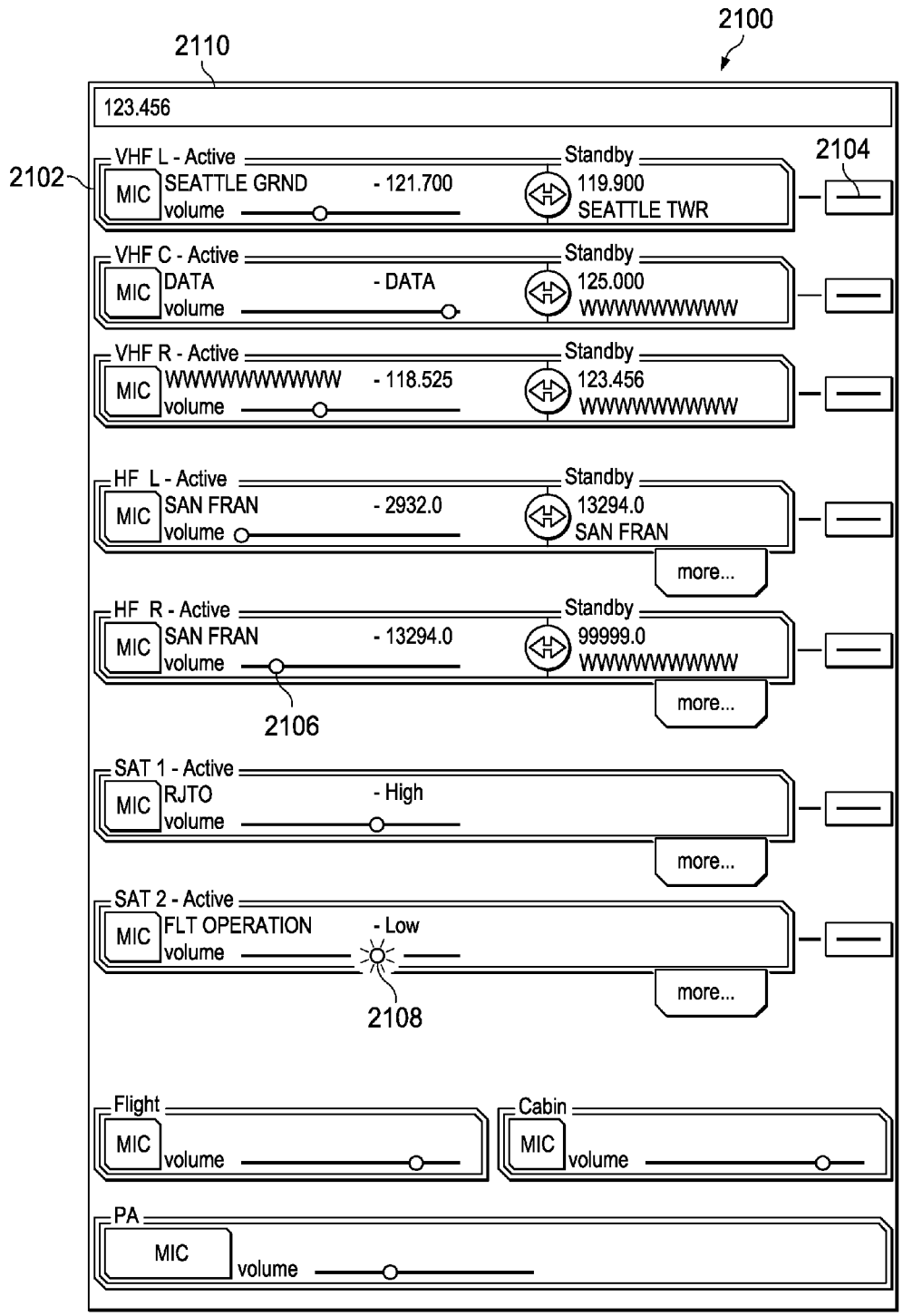
FIG. 21 is an illustration of another interface for controlling a radio in accordance with an illustrative embodiment.

Turning now to FIG. 21, an illustration of another interface for controlling a radio is depicted in accordance with an illustrative embodiment. In this example, interface 2100 is an example of one implementation of another interface comprising a number of controls displayed on touch screen display 1616 for controlling radio 1608 in FIG. 16.

In this example, interface 2100 includes a number of controls comprising images representing buttons 2102 and 2104 and sliders 2106 and 2108. Buttons 2102 and 2104 may be used by an operator to control features of a radio that may be controlled by a simple touch action. For example, without limitation, buttons 2102 and 2104 may be used to control features of a radio such as microphone queuing, frequency transfer, line asset selection, or other radio features.

In this example, sliders 2106 and 2108 may be used by an operator to control features of a radio such as volume or other radio features. The operator may touch the image of slider 2106 or 2108 and slide the touch in a desired direction and distance to change the radio volume or other feature. In this example, slider 2108 is highlighted to indicate current operator interaction with slider 2108. For example, a glow or other indication associated with slider 2108 may indicate to the operator that slider 2108 is active and may limit obscuring the point of contact with the display of the image of slider 2108.

Interface 2100 also may provide for complex operator interactions, such as drag and drop operations or other complex operations. For example, without limitation, such complex operations may be used by an operator to move information from one location to another location on interface 2100. In this example, an operator may use a keyboard or other input device to enter a frequency in scratch pad area 2110 provided on interface 2100. The operator may then use a drag and drop operation to move the frequency information in scratch pad area 2110 to replace any active or standby frequency for the radio.

Figure 22:
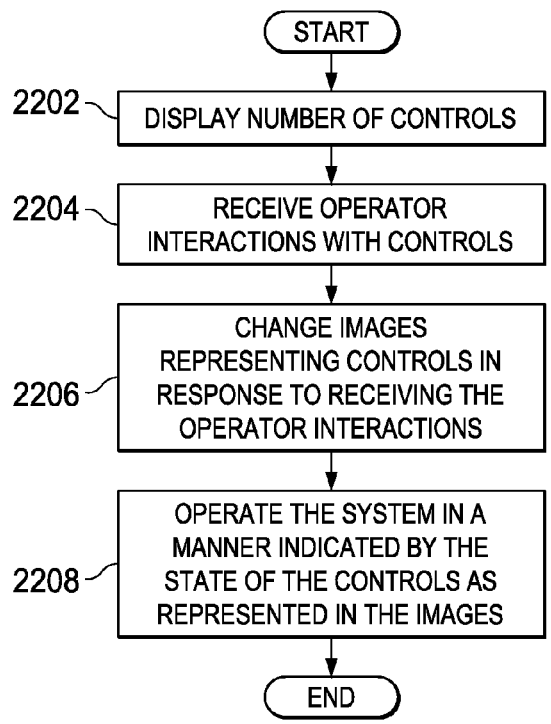
FIG. 22 is an illustration of a flowchart of a process for controlling a system in accordance with an illustrative embodiment.

Turning now to FIG. 22, an illustration of a flowchart of a process for controlling a system is depicted in accordance with an illustrative embodiment. For example, the process of FIG. 22 may be implemented in controller 1620 in FIG. 16.

The process begins by displaying a number of controls on a touch screen display (operation 2202). For example, without limitation, the number of controls may comprise images representing hardware controls for controlling the system. Operator interactions with the controls may be received (operation 2204). For example, the operator interactions may be received in response to the operator touching the images of the controls. The images representing the controls may be changed in response to receiving the operator interactions (operation 2206). The system may be operated in a manner indicated by the state of the controls as represented in the images (operation 2208), with the process terminating thereafter.

Figure 23:
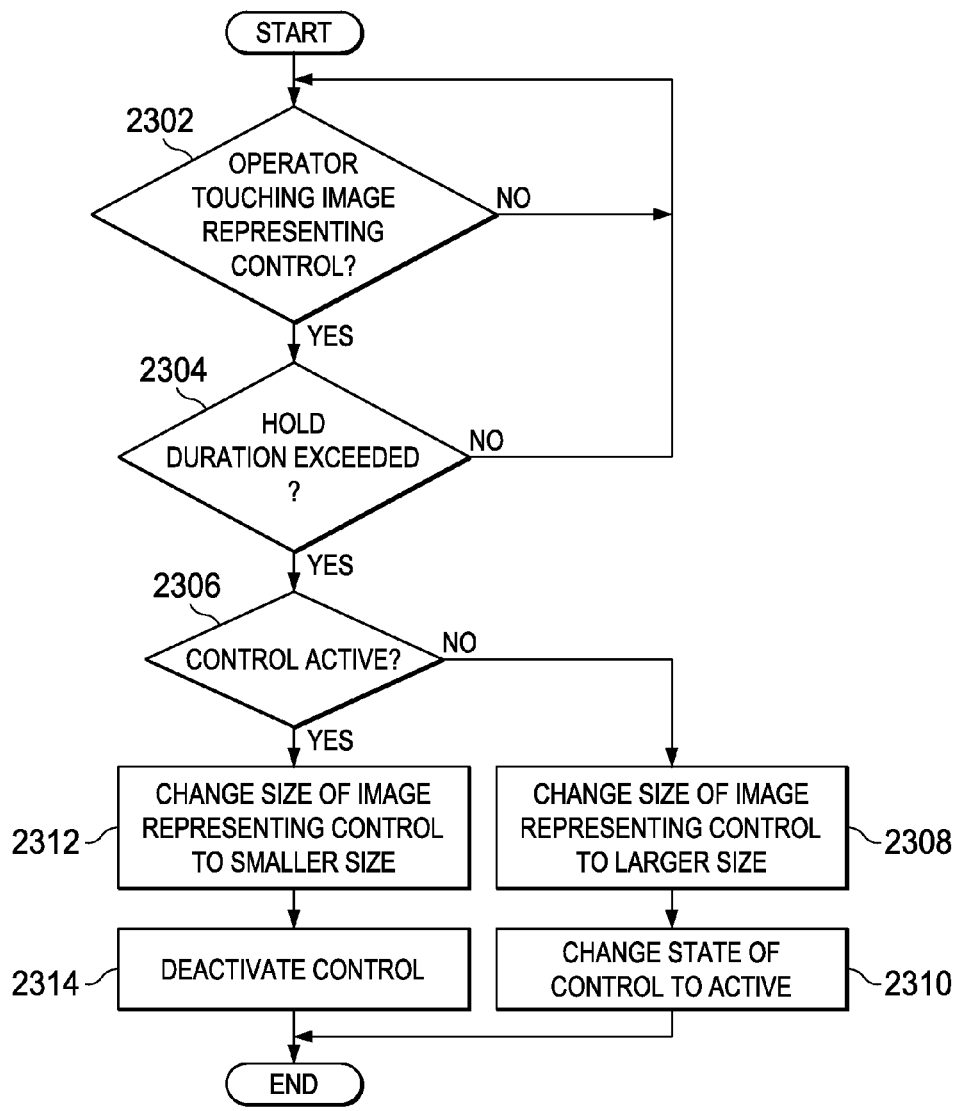
FIG. 23 is an illustration of a flowchart of a process for changing an active state of a control in accordance with an illustrative embodiment.

Turning now to FIG. 23, an illustration of a flowchart of a process for changing an active state of a control is depicted in accordance with an illustrative embodiment. For example, the process of FIG. 23 may be implemented in controller 1620 to change an active state of number of controls 1614 displayed on touch screen display 1616 in FIG. 16.

It first may be determined whether an operator is touching an image representing a control (operation 2302) and whether the operator continues touching the image representing the control for a duration exceeding a hold duration (operation 2304). If the operator is not touching the image representing the control or the operator does not touch the image representing the control for a duration exceeding the hold duration the process may return to operation 2302. Operations 2302 and 2304 may be repeated until it is determined that an operator is touching the image representing the control for a duration exceeding the hold duration.

If it is determined that an operator is touching the image representing the control for a duration exceeding the hold duration, it may be determined whether the control is already active (operation 2306). If it is determined that the control is not active, the size of the image representing the control may be changed to a larger size (operation 2308) and the state of the control may be changed to the active state (operation 2310), with the process terminating thereafter. If it is determined at operation 2306 that the control is active, the size of the image representing the control may be changed to a smaller size (operation 2312) and the control may be deactivated (operation 2314), with the process terminating thereafter.

Figure 24:
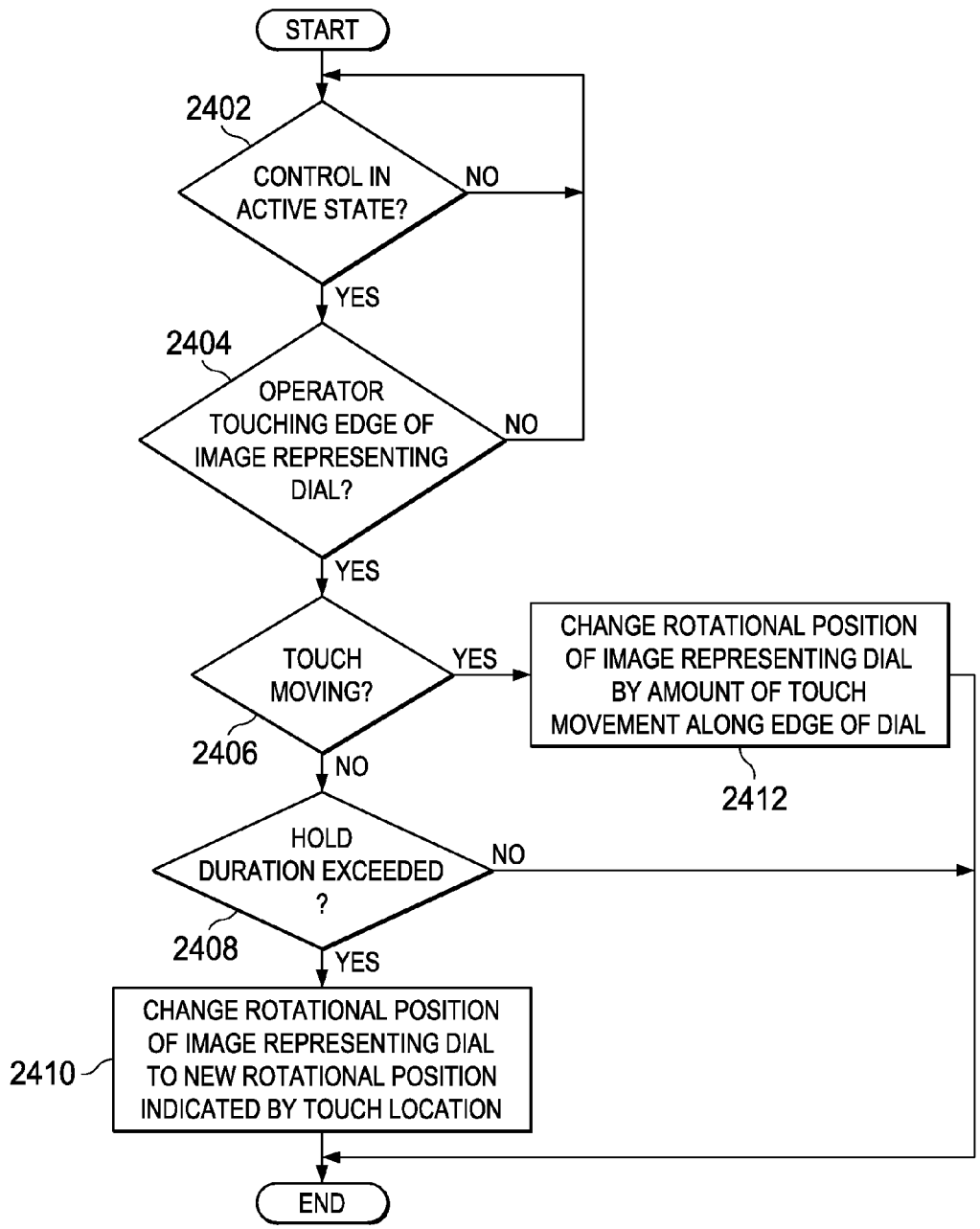
FIG. 24 is an illustration of a flowchart of a process for changing a rotational position of an image representing a dial in accordance with an illustrative embodiment.

Turning now to FIG. 24, an illustration of a flowchart of a process for changing a rotational position of an image representing a dial is depicted in accordance with an illustrative embodiment. For example, the process of FIG. 24 may be implemented in controller 1620 to change a rotational position of dials 1628 displayed on touch screen display 1616 in FIG. 16.

The process may begin by determining whether the control is in an active state (operation 2402). If the control is not in an active state, operation 2402 may be repeated until it is determined that the control is in an active state.

If the control is in an active state, it may be determined whether an operator is touching an edge of the image representing the dial (operation 2404). If the operator is not touching an edge of the image representing the dial, the process may return to operation 2402 and operations 2402 and 2404 may be repeated until it is determined that an operator is touching the edge of the image representing the dial.

If it is determined at operation 2404 that the operator is touching the edge of the image representing the dial, it may be determined whether the touch is moving (operation 2406). If the touch is not moving, it may be determined whether the hold duration is exceeded (operation 2408). If the hold duration is not exceeded, the process may terminate without changing the rotational position of the image representing the dial. If the hold duration is exceeded, the rotational position of the image representing the dial may be changed to a new rotational position indicated by the touch location (operation 2410), with the process terminating thereafter. Returning to operation 2406, if it is determined that the touch is moving, the rotational position of the image representing the dial may be changed by an amount of touch movement along the edge of the image of the dial (operation 2412), with the process terminating thereafter.

Figure 25:
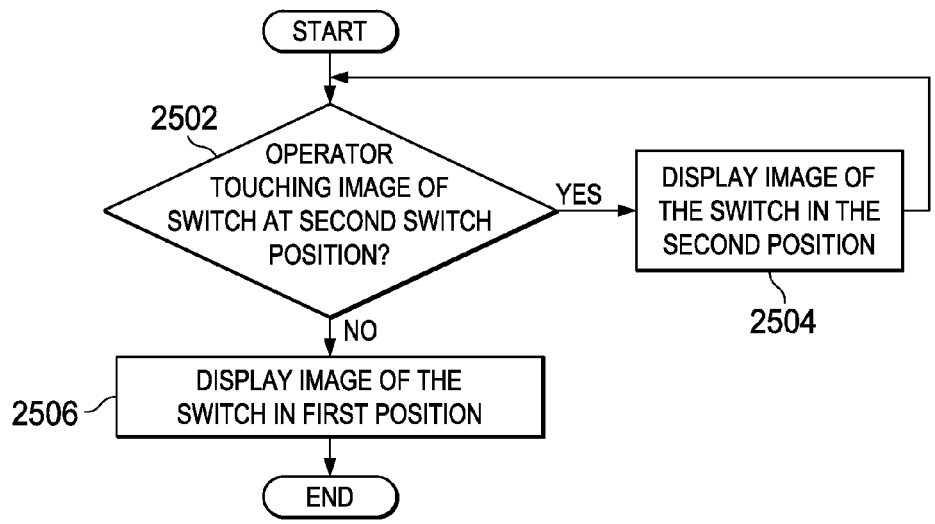
FIG. 25 is an illustration of a flowchart of a process for changing an image representing a switch in accordance with an illustrative embodiment.

Turning now to FIG. 25, an illustration of a flowchart of a process for changing an image representing a switch is depicted in accordance with an illustrative embodiment. For example, the process of FIG. 25 may be implemented in controller 1620 to change images 1625 representing switches 1630 displayed on touch screen display 1616 in FIG. 16. The process of FIG. 25 may be used for changing an image of a momentary switch in response to operator interactions with the image of the switch.

It first may be determined whether an operator is touching the image of the switch at a location of a second switch position (operation 2502). If the operator is touching the image of the switch at the location of the second switch position, an image of the switch in the second position may be displayed (operation 2504). Operations 2502 and 2504 may then be repeated so that an image of the switch in the second position is displayed as long as the operator is touching the image representing the switch at the location of the second switch position. If it is determined at operation 2502 that the operator is not touching the image representing the switch, an image of the switch in a first position may be displayed (operation 2506), with the process terminating thereafter.

One or more of the illustrative embodiments provides a multi-touch interface for aircraft systems, such as radios and other communication systems. The multi-touch interface may include software controls displayed on a touch screen display that comprise images representing conventional hardware controls for such aircraft systems. Therefore, one or more of the illustrative embodiments may provide a capability for a flight crew to use intuitive gesture based interaction for command and information gathering of aircraft systems. The use of multi-touch technology allows for interaction from more than one flight crew member at the same time. A single screen design may provide for improved information presentation in the limited cockpit space.

One or more of the illustrative embodiments may provide weight and cost savings due to the reduction of hardware in the aircraft cockpit. Interfaces using software controls in accordance with illustrative embodiments may lower the cost of future upgrades to existing aircraft systems or the addition of new aircraft systems. Furthermore, interfaces in accordance with illustrative embodiments may provide increased operational capability in comparison to conventional hardware interfaces. In addition, interfaces in accordance with illustrative embodiments may be more easily customized by users.

As will be appreciated by one of skill in the art, the present disclosure may be embodied as a method, system, apparatus, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, or any suitable combination of the foregoing.

Computer program code for carrying out operations for aspects of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. While preferred embodiments have been described above and depicted in the drawings, other depictions of data tags and graphics symbology can be utilized in various embodiments of the disclosure. Graphical symbology may be used in place of text-based indications. Measurement units such as feet, meters, or miles may be suitably changed as appropriate for the task, custom, or convention. Lastly, the nomenclature, color, and geometric shape of the display elements can be varied without departing from the scope of the disclosure as defined by the appended claims.

What is claimed is:

1. A method for controlling an aircraft system, comprising:
    displaying an image, representing a control for the aircraft system, on a touch screen;
    continuously enhancing a hit accuracy characteristic of the image, via adjusting a touch recognition threshold of the image, via using instructions in a controller and based upon the controller receiving an altitude and a speed, of a system on an aircraft;
    receiving, on the touch screen, a first input, the touch screen configured for:
        automatically selecting, via determining a position and an orientation in the aircraft of the touch screen, an aircraft system displayed on and in communication with the touch screen;
        virtually partitioning the touch screen;
        simultaneously recognizing a first input, on a first partition of the touch screen as being from a first source on a first side of the touch screen, and a second input, on a second partition of the touch screen as being from a second source on a second side of the touch screen, via recognizing an orientation, relative to the touch screen, of the first source and of the second source, respectively, and simultaneously processing the first input and the second input;
        determining, via the second input being along an edge of the second partition and coming from the first source on the first side of the touch screen, the second input as an accidental input; and
        responsive to recognizing the accidental input, at least one of: correcting, and ignoring, the accidental input;
    transmitting the first input from the touch screen to an interface controller within the controller for an aircraft comprising the aircraft system;
    changing, based upon the first input, a state of the control to an active state and indicating activating the control via increasing a size of the image via program code in the interface controller communicating with the touch screen;
    subsequent to activating the control, the interface controller receiving a subsequent input to change the state of the control; and
    an aircraft system controller within the controller operating the aircraft system in a manner indicated by the state of the control.

2. The method of claim 1, further comprising:
    the image representing a dial; and
    the first input comprising selecting the dial for a selected duration.

3. The method of claim 1, further comprising:
    the image representing a dial;
    changing a rotational position of the image representing the dial to a new rotational position in response to the first input touching an edge of the image representing the dial at a position; and
    indicating the new rotational position and indicating the state of the control via the rotational position of the image representing the dial.

4. The method of claim 1, further comprising:
    the image representing a dial;
    changing a rotational position of the image representing the dial to a new rotational position in response via a sliding input along an edge of the image representing the dial to indicate an amount of rotation of the image representing the dial; and
    indicating, via the rotational position of the image representing the dial, the state of the control represented by the image representing the dial.

5. The method of claim 1, further comprising:
    the image representing a switch;
    the controller interface changing the image representing the switch from an image of the switch in a first position to an image of the switch in a second position in response to receiving an input touching the image representing the switch at the second position; and
    the controller interface changing the image representing the switch from the image of the switch in the second position to the image of the switch in the first position in response to stopping the input touching the image representing the switch at the second position, wherein the state of the control represented by the image representing the switch is indicated by the position of the switch in the image representing the switch.

6. The method of claim 1, wherein the aircraft system is a radio on the aircraft.

7. An apparatus, that comprises:
    a touch screen display located in a cockpit of an aircraft and configured to:
        transition, responsive to a reception on the touch screen display of a 4-finger swipe right, from a map to a plan image on the touch screen display;
        transition, responsive to a reception on the touch screen display of a 4-finger swipe left, from a plan to a map image on the touch screen display; and present, responsive to a six-plus fingers down swipe on the touch screen display, a keyboard on the touch screen display; and a controller comprising: processor unit, an interface controller, and an aircraft system controller, the interface controller comprising a data processing device comprising instructions programmed to:
  display on the touch screen display an image that represents a control for an aircraft system;
  automatically select, based upon a position and an orientation in the aircraft of the touch screen display, an aircraft system displayed on and in communication with the touch screen display;
  virtually partition the touch screen display into multiple partitions;
  simultaneously recognize:
    a first input, on a first partition of the touch screen display as being from a first source on a first side of the touch screen display; and
    a second input, on a second partition of the touch screen display as being from a second source on a second side of the touch screen display, based upon a recognition of an orientation, relative to the touch screen display, of the first source and of the second source, respectively, and simultaneously process the first input and the second input;
  continuously enhance a hit accuracy characteristic of the image, via instructions programmed to:
    adjust a touch recognition threshold of the image based upon the controller receiving an altitude and a speed of a system on the aircraft;
    determine, based upon the second input being along an edge of the second partition and coming from the first source on the first side of the touch screen display, the second input as an accidental input; and
    responsive to a recognition of the accidental input, at least one of: correct, and ignore, the accidental input;
  receive from the touch screen display, an indication of the first input to the control, and, responsive to the first input, change a state of the control; and
  change the image to represent the change in the state of the control in response to receiving the indication; and the aircraft system controller comprising instructions programmed to operate the aircraft system in a manner indicated by the state of the control.

8. The apparatus of claim 7, further comprising the image representing a dial, and wherein the controller comprises instructions programmed to change a size of the image representing the dial in response to receiving the indication for a selected duration.

9. The apparatus of claim 8, further comprising the controller comprising instructions programmed to increase the size of the image representing the dial to a larger size and to change the state of the control corresponding to the image representing the dial to an active state when the image representing the dial is changed to the larger size, such that with the control in the active state, the controller interface comprises instructions programmed to change another state of the control based upon input from the touch screen display.

10. The apparatus of claim 7, further comprising the image representing a dial and the interface controller comprising instructions programmed to change a rotational position of the image representing the dial to a new rotational position in response to inputs that touch an edge of the image representing the dial on the touch screen display at a position indicating the new rotational position for a selected duration, wherein the state of the control represented by the image representing the dial is indicated by the rotational position of the image representing the dial.

11. The apparatus of claim 7, further comprising the image representing a dial and the interface controller comprising instructions programmed to change a rotational position of the image representing the dial to a new rotational position in response to an input that slides a touch along an edge of the image representing the dial on the touch screen display to indicate an amount of rotation of the image representing the dial, wherein the state of the control represented by the image representing the dial is indicated by the rotational position of the image representing the dial.

12. The apparatus of claim 7, wherein the control comprises an image representing a switch and the controller comprises instructions programmed to:
  change the image representing the switch from an image of the switch in a first position to an image of the switch in a second position in response to an indication of a touch on the image representing the switch on the touch screen display at the second position; and
  change the image representing the switch from the image of the switch in the second position to the image of the switch in the first position in response to stopping the indication, wherein the state of the control represented by the image representing the switch is indicated by the position of the switch in the image representing the switch.

13. The apparatus of claim 7, wherein the aircraft system is a radio on the aircraft.

14. An apparatus that comprises:
a touch screen display;
a controller that comprises: a processor unit, an interface controller, and a system controller, such that the interface controller comprises a data processing device that comprises instructions programmed to:
  display on the touch screen display a number of controls for controlling a radio, wherein the number of controls comprises images selected from images of dials, images of switches, images of buttons, and images of sliders;
  automatically select, based upon a position and an orientation in an aircraft of the touch screen display, an aircraft system displayed on and in communication with the touch screen display;
  virtually partition the touch screen display into multiple partitions;
  simultaneously recognize:
    a first input, on a first partition of the touch screen display as being from a first source on a first side of the touch screen display; and
    a second input, on a second partition of the touch screen display as being from a second source on a second side of the touch screen display, based upon a recognition of an orientation, relative to the touch screen display, of the first source and of the second source, respectively, and simultaneously process the first input and the second input;
  continuously enhance a hit accuracy characteristic of each of the images, via instructions programmed to:
    adjust a touch recognition threshold of each of the images based upon the controller receiving, from a system, an altitude and a speed, of an aircraft;

determine, based upon the second input being along an edge of the second partition and coming from the first source on the first side of the touch screen display, the second input as an accidental input;

responsive to a recognition of the accidental input, at least one of: correct, and ignore, the accidental input;

remove, responsive to receipt of a mode-less gesture, a menu image on the touch screen display; and provide instant haptic feedback based upon a validity of the first input; and receive, from the touch screen display, indications of the first input with the number of controls, and, responsive to the first input, change a state of the number of controls;

change the images to represent a change in the state of the number of controls in response to receiving the first input; and the system controller comprising instructions programmed to operate the radio in a manner indicated by the state of the number of controls as represented in the images.

15. The apparatus of claim 14, further comprising the controller comprising instructions programmed to change the images to indicate the change in the state of the number of controls to an active state in response to receiving the indications, wherein other states of the number of controls are changeable by the first input with the number of controls when the number of controls is in the active state.

16. The apparatus of claim 14, further comprising the controller comprising instructions programmed to change the images to represent changes in the state of the number of controls in response to receiving indications corresponding to a drag and drop operation input on the touch screen display.

17. The apparatus of claim 14, wherein the touch screen display is located in a cockpit of an aircraft and the radio is located on the aircraft.

18. A method for enhancing a hit accuracy characteristic of a control for an aircraft system, the method comprising:

displaying the control for the aircraft system via displaying an image of the control;

automatically selecting, via determining a position and an orientation of a touch screen in an aircraft, the aircraft system displayed on and in communication with the touch screen;

virtually partitioning the touch screen;

continuously enhancing the hit accuracy characteristic of the image, via instructions programmed for:

adjusting a touch recognition threshold of the image based upon a controller receiving an altitude and a speed of a system on the aircraft;

simultaneously recognizing a first input, on a first partition of the touch screen as being from a first source on a first side of the touch screen, and a second input, on a second partition of the touch screen as being from a second source on a second side of the touch screen, via recognizing an orientation, relative to the touch screen, of the first source and of the second source, respectively, and simultaneously processing the first input and the second input;

determining, via the second input being along an edge of the second partition and coming from the first source on the first side of the touch screen, the second input as an accidental input;

responsive to recognizing the accidental input, at least one of: correcting, and ignoring, the accidental input;

removing, responsive to receiving a mode-less gesture, a menu on the touch screen; and providing instant haptic feedback based upon determining a validity of the first input; and receiving an interaction with the image, wherein the image represents a dial configured to move between a discrete number of rotational positions;

changing the image representing the dial to indicate a change in a rotational position of the dial in response to receiving the interaction; and operating the aircraft system in a manner indicated by the rotational position of the dial as represented in the image.

19. The method of claim 18 further comprising:

increasing a size of the image, representing the dial, to a larger size in response to receiving the interaction, with the image representing the dial, lasting for a selected duration; and changing a state of the control to an active state when the image changes to the larger size, wherein the rotational position of the image representing the dial is changeable by an interface controller receiving the interaction with the image representing the dial when the control corresponding to the image representing the dial is in the active state.

20. The method of claim 18, wherein changing the image representing the dial to indicate the change in the rotational position of the dial comprises changing the rotational position of the image representing the dial by one discrete rotational position in a direction in response to receiving the interaction in which an operator touches the image representing the dial on a side of the image representing the dial corresponding to the direction.

21. The method of claim 18, wherein the aircraft system is a radio on the aircraft.

22. An apparatus that comprises:

a touch screen display located in a cockpit of an aircraft;

a controller comprising: a processor unit, an interface controller, and an aircraft system controller, the interface controller comprising a data processing device comprising instructions programmed to:

display on the touch screen display an image representing a dial, wherein the dial is configured to be moved between a discrete number of rotational positions;

automatically select, based upon a position and an orientation in an aircraft of the touch screen display, an aircraft system displayed on and in communication with the touch screen display;

virtually partition the touch screen display into multiple partitions;

continuously enhance a hit accuracy characteristic of the image, via instructions programmed to at least one of:

adjust a touch recognition threshold of the image based upon the controller receiving an altitude and a speed, of a system on the aircraft;

simultaneously recognize:

a first input, on a first partition of the touch screen display as being from a first source on a first side of the touch screen display; and a second input, on a second partition of the touch screen display as being from a second source on a second side of the touch screen display, based upon a recognition of an orientation, relative to the touch screen, of the first source and of the second source, respectively, and simultaneously process the first input and the second input;

determine, based upon the second input being along an edge of the second partition and coming from the first source on the first side of the touch screen display, the second input as an accidental input; and responsive to a recognition of the accidental input, at least one of: correct, and ignore, the accidental input;

remove, responsive to receipt of a mode-less gesture, a menu image on the touch screen display; and provide instant haptic feedback based upon a validity of the input; and receive from the touch screen display an indication of an interaction with the image representing the dial, and, responsive to the interaction, change a state of the control; and change the image representing the dial to indicate a change in a rotational position of the dial in response to receiving the indication; and the aircraft system controller comprising instructions programmed to operate the system in a manner indicated by the rotational position of the dial as represented in the image.

23. The apparatus of claim 22, wherein the controller further comprises instructions programmed to:

increase a size of the image representing the dial to a larger size in response to receiving the interaction with the image representing the dial such that the interaction comprised the image representing the dial receiving an input for a selected duration; and change a state of the control corresponding to the image representing the dial to an active state when the image representing the dial is changed to the larger size, wherein the rotational position of the image representing the dial changes via-inputs received at-the image representing the dial when the control corresponding to the image representing the dial is in the active state.

24. The apparatus of claim 22, wherein the controller further comprises instructions programmed to change the rotational position of the image representing the dial by one discrete rotational position in a direction in response to receiving an input at the image representing the dial on a side of the image representing the dial corresponding to the direction.

25. The apparatus of claim 22, wherein the system is a radio on the aircraft.

26. A method of configuring a haptically-enabled, moveable, and networked flexible display/control interface for a task, the method comprising:

executing, in a data processing device in an interface controller, instructions programmed for:

displaying on a touch screen display in a cockpit of an aircraft, an image representing a dial configured to be moved between a discrete number of rotational positions;

automatically selecting, via determining a position and an orientation of the touch screen display in the aircraft, an aircraft system displayed on and in communication with the touch screen display;

virtually partitioning the touch screen display;

continuously enhancing a hit accuracy characteristic of the image, via instructions programmed for:

adjusting a touch recognition threshold of the image based upon a controller, comprising the interface controller, receiving information about a speed and an altitude, of the aircraft;

recognizing simultaneous inputs from distinct areas on the touch screen display; and simultaneously recognizing a first input, on a first partition of the touch screen display as being from a first source on a first side of the touch screen display, and a second input, on a second partition of the touch screen display as being from a second source on a second side of the touch screen, via recognizing an orientation, relative to the touch screen display, of the first source and of the second source, respectively, and simultaneously processing the first input and the second input;

determining, via the second input being along an edge of the second partition and coming from the first source on the first side of the touch screen display, the second input as an accidental input;

responsive to recognizing the accidental input, at least one of: correcting, and ignoring, the accidental input;

removing, responsive to receipt of a mode-less gesture, a menu image on the touch screen display;

providing instant haptic feedback based upon a validity of the first input;

receiving from the touch screen display an indication of an interaction with the image representing the dial, and, responsive to the interaction, changing a state of the control; and changing the image representing the dial and indicating a change in a rotational position of the dial in response to receiving the indication; and operating an aircraft system, via an aircraft system controller comprising programmed instructions, in a manner indicated by the rotational position of the dial as represented in the image.

* * * * *